(12) United States Patent
Duncan et al.

(10) Patent No.: US 6,597,394 B1
(45) Date of Patent: Jul. 22, 2003

(54) PROGRAMMABLE IMAGE TRANSFORM PROCESSOR FOR DIGITAL IMAGE PROCESSING

(75) Inventors: Kathleen A. Duncan, Santa Cruz, CA (US); William S. Jacobs, Santa Cruz, CA (US); Robert G. Taylor, Scotts Valley, CA (US)

(73) Assignee: Pictos Technologies, Inc., Newport Beach, CA (US)

( * ) Notice: Subject to any disclaimer, the term of this patent is extended or adjusted under 35 U.S.C. 154(b) by 0 days.

(21) Appl. No.: 09/188,871

(22) Filed: Nov. 9, 1998

Related U.S. Application Data

(60) Provisional application No. 60/066,022, filed on Nov. 16, 1997.

(51) Int. Cl.[7] .......................... H04N 5/228; H04N 5/76; H04N 7/12; G06K 9/36
(52) U.S. Cl. .............................. 348/222.1; 348/231.99; 348/403.1; 375/240.18; 375/240.19; 382/248; 382/250
(58) Field of Search .................... 348/222.1, 231.99, 348/403.1; 375/240.18, 240.19, 240.2; 382/248, 250

(56) References Cited

U.S. PATENT DOCUMENTS

| | | | |
|---|---|---|---|
| 4,630,307 A | 12/1986 | Cok | |
| 5,008,739 A | 4/1991 | D'Luna et al. | |
| 5,053,861 A | 10/1991 | Tsai et al. | |
| 5,249,053 A | 9/1993 | Jain | |
| 5,373,322 A | 12/1994 | Laroche et al. | |
| 5,382,976 A | 1/1995 | Hibbard | |
| 5,493,335 A | * 2/1996 | Parulski et al. | 348/233 |
| 5,497,246 A | 3/1996 | Abe | |
| 5,534,921 A | 7/1996 | Sawanobori | |
| 5,629,734 A | 5/1997 | Hamilton, Jr. et al. | |
| 5,666,160 A | 9/1997 | Hwang | |
| 5,666,209 A | 9/1997 | Abe | |
| 5,748,124 A | * 5/1998 | Rosenthal et al. | 341/120 |
| 5,754,874 A | * 5/1998 | Watanabe et al. | 395/800.01 |
| 5,920,343 A | * 7/1999 | Watanabe et al. | 348/222.1 |
| 5,982,425 A | * 11/1999 | Allen et al. | 348/231 |
| 5,996,059 A | * 11/1999 | Porten et al. | 712/200 |
| 6,005,384 A | * 12/1999 | Hemminger et al. | 324/142 |
| 6,046,769 A | * 4/2000 | Ikeda et al. | 348/222.1 |
| 6,177,956 B1 | * 1/2001 | Anderson et al. | 348/231 |

* cited by examiner

*Primary Examiner*—Wendy R. Garber
*Assistant Examiner*—Lin Ye
(74) *Attorney, Agent, or Firm*—Farjami & Farjami LLP

(57) ABSTRACT

A programmable image transform processor has a programmable addressing and arithmetic blocks. In the programmable addressing block, an input address generator has an input addressing microsequencer and an input addressing memory that stores an input addressing procedure. The microsequencer executes the input addressing procedure to generate addresses from which to request image data. In the programmable arithmetic block, an arithmetic block memory stores an image processing procedure and a microsequencer executes the image processing procedure using the image data to generate transformed image data.

22 Claims, 12 Drawing Sheets

Fields of the Arithmetic Block Configuration Register

| SHIFT SIZE | DESCALE MODE | DESCALE SHIFT | 8bit/16bit | Signed/ Unsigned | Hist Bit Select | Hist 256 bits | Hist All Enable | UPPER BOUND CHECK | LOWER BOUND CHECK |

Fields of the Arithmetic Block Control and Status Register

| IP | DP | CW | FLUSH | DEBUG | BREAK | HALT |

FIG. 6D

| Control Word | msel3 | msel2 | msel1/capture/histogram control | msel0 | coef3 | coef2 | coef1 | coef0 or offset |

Fields of Control Word 0 Instruction

FIG. 6E

| 0 | SHF | MUL | ADO | LDA | ADA | LDO | CAP |

Control Word Fields

FIG. 6F

| BIT SELECT | BIT MASK | SHF | LDOS | LDY | LDM | SAM |

Fields of Control Word 1 Instruction

FIG. 6G

PROGRAMMABLE IMAGE TRANSFORM PROCESSOR FOR DIGITAL IMAGE PROCESSING

This application claims the benefit of U.S. Provisional Application No. 60/066,022, filed Nov. 16, 1997, which is hereby incorporated herein by reference.

The present invention relates generally to digital image processing, and particularly to a programmable image transform processor for digital image processing.

BACKGROUND OF THE INVENTION

Advances in technology have made possible the electronic still camera for photography. In photographic cameras, the image-forming light is sensed and recorded directly on film. Unlike photographic cameras, the electronic still camera uses an electronic image sensor to sense the image-forming light and a separate recording medium to record and store the picture. Because the electronic still camera uses digital technology, the electronic still camera is a type of digital camera.

Typically the electronic image sensor in a digital camera is a solid-state device such as a charge-coupled device (CCD) or a CMOS device. The image sensor connects to electronic interface circuitry which connects to a storage device and, optionally, to a display.

A typical image sensor has many cells or pixels arranged along vertical and horizontal dimensions in a matrix. In response to light, the cells generate a charge or voltage which represents image information. The image sensor senses an image and stores image information, i.e., a charge or voltage, corresponding to the sensed light in the cells. Image sensors are made in many sizes such as, e.g., 400× 300, 640×480, 1024×768, and 4096×4096 pixels. The image information stored in the cells is output serially from the image sensor using an arrangement of shift registers. The shift registers are arranged along vertical and horizontal dimensions and are coupled to the cells. The cells and shift registers require timing, or clock, signals, having specific timing requirements, to output the image information. Each type of image sensor has its own unique timing requirements. Typically, a single image sensor requires many clock signals to control the flow of image information in both the horizontal and vertical dimensions. The clock signals must be synchronized. For example, to output image information from a 640×480 CCD requires 480 vertical shifts and 640 horizontal shifts for each vertical shift. Within a single dimension, the clock signals to control the flow of image information have different phases that must be synchronized. Furthermore, shifting the information out of the image sensor requires timing signals to synchronize the image sensor's operation with an analog signal processor (ASP) and an analog-to-digital (A/D) converter.

The image information sensed by each cell is also called a pixel. For example, a 640×480 CCD has about 307,200 pixels. After being converted to digital form, the image information (image data) is stored in a memory, typically an image memory. Image sensors having a larger numbers of cells produce higher quality images; however, more pixel information must be processed and stored.

Typically, a digital signal processor processes the digital image data to improve the quality of the image. Various algorithms well-known in the art are used to improve image quality. Because there is such a large amount of image data, the image data is compressed before storage in a storage medium.

Color imaging increases the complexity of processing the digital image data. In one method, the image sensor has a geometric arrangement of cells to respond to three colors, e.g., red, green and blue. Since each cell senses a particular color, various algorithms are used to interpolate the missing color information. Alternatively, two or more image sensors having different color sensitivity can be used and the image information is combined.

In digital cameras, processing the image data takes time. Raw image information from the image sensor is transferred through the analog signal processor, processed by the analog-to-digital converter and stored in memory. Furthermore, a digital signal processor processes the image information to improve the quality of the image. For color images using a single image sensor, "missing" pixel data values must be interpolated, thereby taking even more processing time. Still images are further processed to compensate and correct for other errors introduced by the optical system and the sensor. The compression of the raw image data adds even more time. The time required to acquire, process and compress the raw image data causes an unacceptable delay when acquiring consecutive images. The delay can take several seconds. This delay is a problem for photographers who need a continuous shooting capability to photograph a sequence of images in quick succession. Therefore a method and apparatus are needed to reduce the delay between consecutive pictures.

Typically, a digital camera has hardware that implements a single digital image processing procedure or algorithm. If the procedure is changed, the hardware must be redesigned, which is time consuming and expensive. Therefore a method and apparatus that allows the digital image processing procedure to be easily and quickly modified, and that supports numerous digital signal processing procedures using the same hardware. The method and apparatus must also minimize processing time to allow consecutive pictures to be taken in quick succession.

In addition, depending on the environmental factors, such as lighting, the image processing algorithm may need to be selected or modified to produce the desired image quality. Furthermore, there is a need to dynamically modify the image processing algorithm during the image acquisition process.

SUMMARY OF THE INVENTION

A programmable image transform processor has a programmable addressing and arithmetic blocks. In the programmable addressing block, an input address generator has an input addressing microsequencer and an input addressing memory that stores an input addressing procedure. The microsequencer executes the input addressing procedure to generate addresses from which to request image data. In the programmable arithmetic block, an arithmetic block memory stores an image processing procedure and a microsequencer executes the image processing procedure using the image data to generate transformed image data.

In an alternate embodiment, the programmable arithmetic block receives digital image data directly from an image sensor via an A/D converter, transforms that data and the programmable addressing block generates addresses at which to store the transformed image data.

The programmable image transform processor partitions address formation and arithmetic manipulation into parallel hardware. Input and output data are collected into bursts to access the same DRAM page.

BRIEF DESCRIPTION OF THE DRAWINGS

FIG. 6B is a diagram of an arithmetic block configuration register.

FIG. 6D is a diagram of the Arithmetic Block Control and Status register.

FIG. 6E is a diagram showing the format of a control word 0 instruction.

FIG. 6F is a diagram of the control word field of the control word 0 instruction of FIG. 6E.

FIG. 6G is a diagram showing the format of a control word 1 instruction.

DESCRIPTION OF THE PREFERRED EMBODIMENTS

Figure 1:
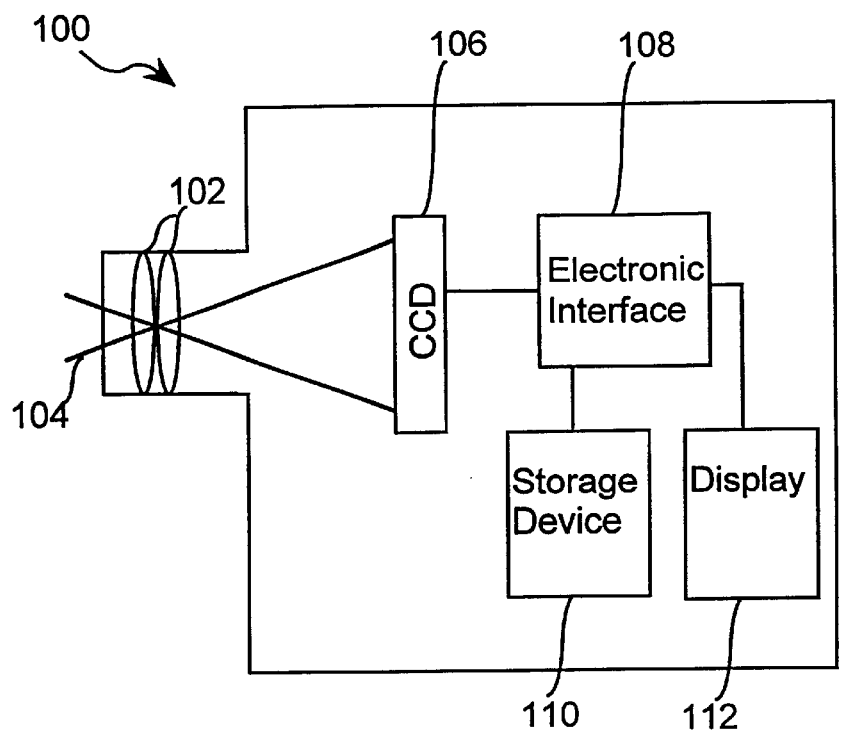
FIG. 1 is a block diagram of a electronic digital camera embodying the image transform processor of the present invention.

FIG. 1 is a block diagram of a digital camera embodying the image transform processor of the present invention. A lens 102 transmits the image forming light 104 onto an electronic image sensor (image sensor) 106. The image sensor 106 is built into the camera and is located at the focal plane of the lens. The image sensor is typically a charge-coupled device (CCD) or a complementary metal-oxide-semiconductor (CMOS) sensor. Image sensors differ in the arrangement of the cells within the image sensor and the type of charge readout. The image sensor 106 connects to electronic interface circuitry 108. The electronic interface circuitry 108 also connects to a storage device 110 and an optional display 112. The electronic interface circuitry 108 controls the storage device 110 to store the image sensed by the image sensor 106. The storage device 110 can include a tape drive, a disk drive, such as a floppy disk drive, hard disk drive, optical disk drive or magneto-optical disk drive, or an integrated circuit card with RAM or EEPROM. The storage device 110 can be inside the digital camera 100 or attached to the camera externally. The electronic interface circuitry 108 can also control the display 112 to display the image sensed by the image sensor 106. The display 112 can be inside the digital camera or attached to the camera externally. The electronic interface circuitry can operate the display 112 in either a viewfinder mode or a review, i.e., stored image viewing mode.

Figure 2:
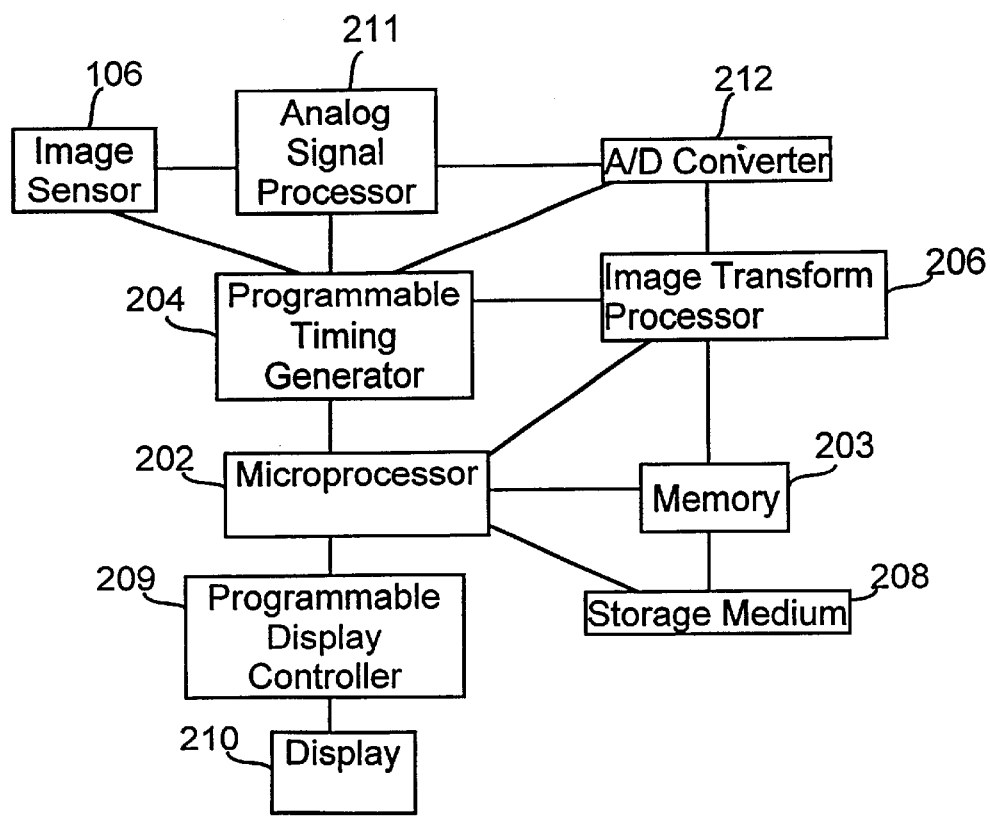
FIG. 2 is a detailed block diagram of the electronic digital camera of FIG. 1.

FIG. 2 is a block diagram of the electronic interface circuitry of the electronic digital camera of FIG. 1. A microprocessor 202 is coupled to a memory 203, a programmable timing generator 204, a programmable image transform processor 206, a storage medium 208 and a display controller 209. The display controller 209 is coupled to a display 210. The image sensor 106 is coupled to an analog signal processor (ASP) 211 which connects to the analog to digital converter (A/D converter) 212. The timing generator 204 is coupled to the image sensor 106, ASP 211, the A/D converter 212, the programmable image transform processor 206, and the microprocessor 202. The programmable image transform processor 206 is also coupled to the memory 203. Preferably, the memory 203 is a high-speed DRAM used to store the digital image data. The A/D converter 212 supplies digital image data to the image transform processor 206 which stores the data in the memory 203. The timing generator 204 supplies timing signals to the DSP 206 and A/D converter 212 to synchronize the transfer of digital image data between the A/D converter 212 and the DSP 206.

The microprocessor 202 executes a camera operation procedure which is stored in memory 203. Alternatively the camera operation procedure can be stored in a read-only-memory, or loaded into the memory 203 from the storage medium 208. The camera operation procedure comprises an image acquisition procedure. When a user presses a store-image button (not shown), the camera operation procedure causes the image sensor 106 to acquire an image. The image acquisition procedure causes the microprocessor 202 to control the timing generator 204 to generate vertical and horizontal clock signals for use by the image sensor 106. The image sensor 106 outputs image data comprising a series of analog signals corresponding to the color and intensity of the image sensed by each cell. The image data is then sent to the ASP 211 and to the A/D converter 212.

The ASP 211 processes the image data before input to the A/D converter 212. For example, the ASP has a programmable amplifier with adjustable gain, and also reduces or eliminates noise, such as reset noise, from the image data using methods well known to those in the art, such as correlation-double-sampling. The A/D converter 212 then converts the analog image data into digital image data. In an alternative embodiment, the ASP 211 is not used.

The digital image data is stored in memory 203. Execution of camera operation procedure by the microprocessor 202 causes the digital image data to be processed by the programmable image transform processor (ITP) 206. The processed digital image data is compressed and recorded in memory 203, on a storage medium 208 or transferred to display controller 209 for output to a display 210.

U.S. Provisional Patent application, titled "Programmable Timing Generator for a Digital Camera," Ser. No. 60/066,023, filed Nov. 16, 1997, is hereby incorporated by reference as background information regarding the programmable timing generator 204. U.S. patent application, titled "Programmable Timing Generator for a Digital Camera," Ser. No. 09/188,831, filed Nov. 9, 1998, is also hereby incorporated by reference as background information regarding timing generator 204.

U.S. patent application, titled "Programmable Display Controller for a Digital Camera,"Ser. No. 60/066,024, filed Nov. 16, 1997, is hereby incorporated by reference as background information regarding display controller 209. U.S. patent application, titled "Programmable Display Controller for a Digital Camera," Ser. No. 09/188,996 filed Nov. 9, 1998, is also hereby incorporated, by reference as background information regarding display controller 209.

Figure 3:
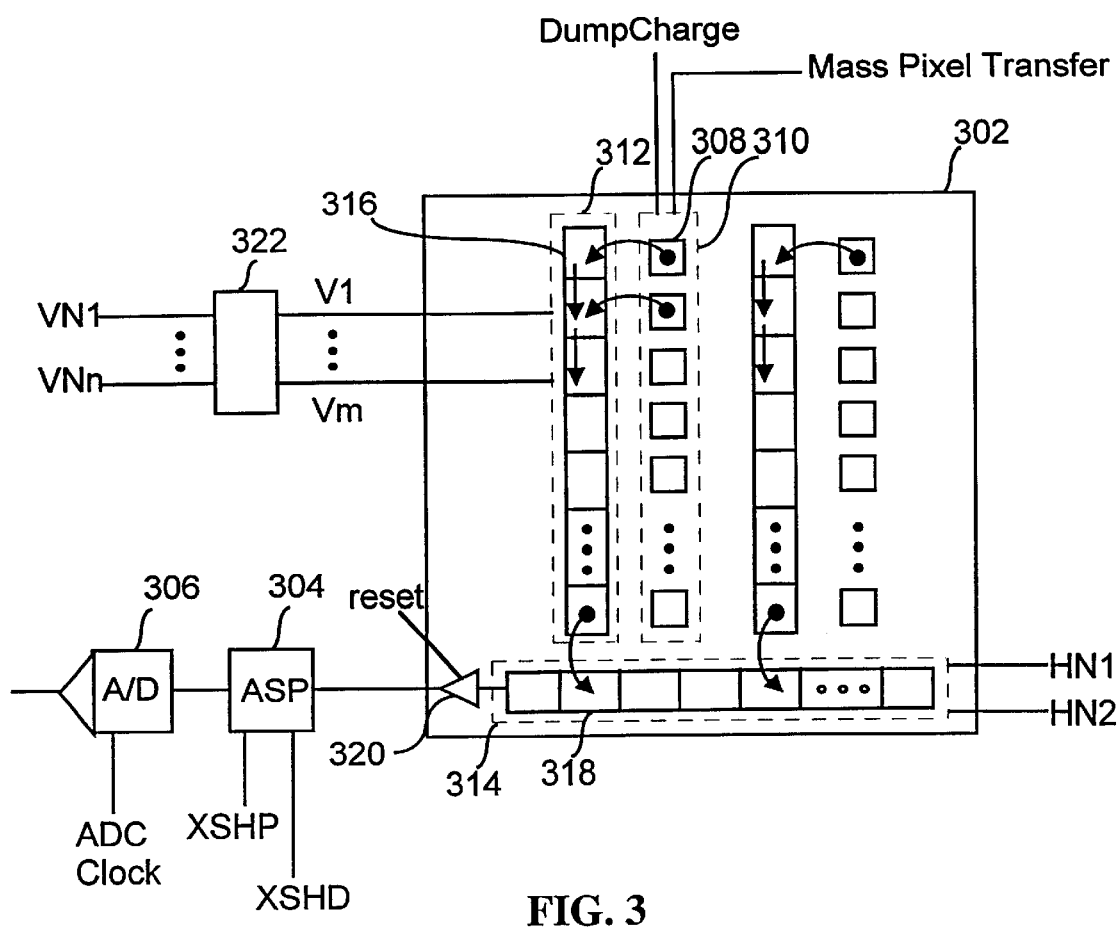
FIG. 3 is a diagram of an exemplary image sensor suitable for use with the image transform processor of the present invention.

FIG. 3 is a block diagram of an exemplary image sensor suitable for use with the present invention. The image sensor 302 can be a CCD or CMOS device. The image sensor 302 connects to the ASP 304 and the A/D converter 306. The image sensor 302 has cells 308, vertical shift registers 312 and a horizontal shift register 314. Each cell 308 absorbs light and converts the light energy into an electrical charge. The amount of charge is a measure of the light energy absorbed. The size of the image sensor determines the quality of the image. The quality of the image improves as the number of cells increases. Image sensors are available in many sizes such as 400×300, 640×480, 1024×768, and 4096×4096 cells.

The components of the image sensor 302 are arranged along horizontal and vertical dimensions. An array 310 of cells 308 is arranged in the vertical dimension. The vertical shift register 312 has elements 316 for storing the charge sensed by the cells 308. Each cell 308 in the array of cells 310 connects to a corresponding element 316 in the vertical shift register 312.

Free charge moves from regions of higher potential to regions of lower potential. By alternating the voltage on the electrodes (not shown) connected to the cells 308 and the elements 316, 318 of the shift registers 312, 314 in proper phase, a charge packet, i.e., the charge from the cell 308, can be moved from the cell 308 to an element 316 of the shift register 312 and then moved from one element to another element in the shift registers and finally to the image sensor 302 output.

In other words, when appropriate voltages are applied to the cell 308 and the corresponding element 316 in the vertical shift register 312, the charge generated in the cell 308 is transferred out of the cell 308 to the corresponding element 316 in the vertical shift register 312. The programmable timing generator is programmed to output timing or clock signals to cause the transfer of the charge to occur at the appropriate time. When appropriate voltages are applied to adjacent elements of the vertical shift register 312, the charge is transferred from one element to another. The last element or output of each vertical shift register 312 connects to a corresponding element 318 in the horizontal shift register 314. When appropriate voltages are applied to the last element of the vertical shift register 312 and the corresponding element 318 of the horizontal shift register 314, the charge is transferred from the vertical shift register 312 to the horizontal shift register 314. When appropriate voltages are applied to adjacent elements of the horizontal shift register 314, the charge is transferred from one element to another and finally output. The output of the horizontal shift register 314 connects to the ASP 304 via an output amplifier 320.

Color imaging is more complex. In one method, the image sensor 302 has a geometric arrangement of cells to respond to three colors, e.g., red, green and blue. Alternatively, two or more image sensors having different color sensitivity are used. The programmable image transform processor of the present invention works with both methods of color imaging.

The programmable image transform processor performs image transform operations on input data after it has been digitized by the A/D converter.

Figure 4:
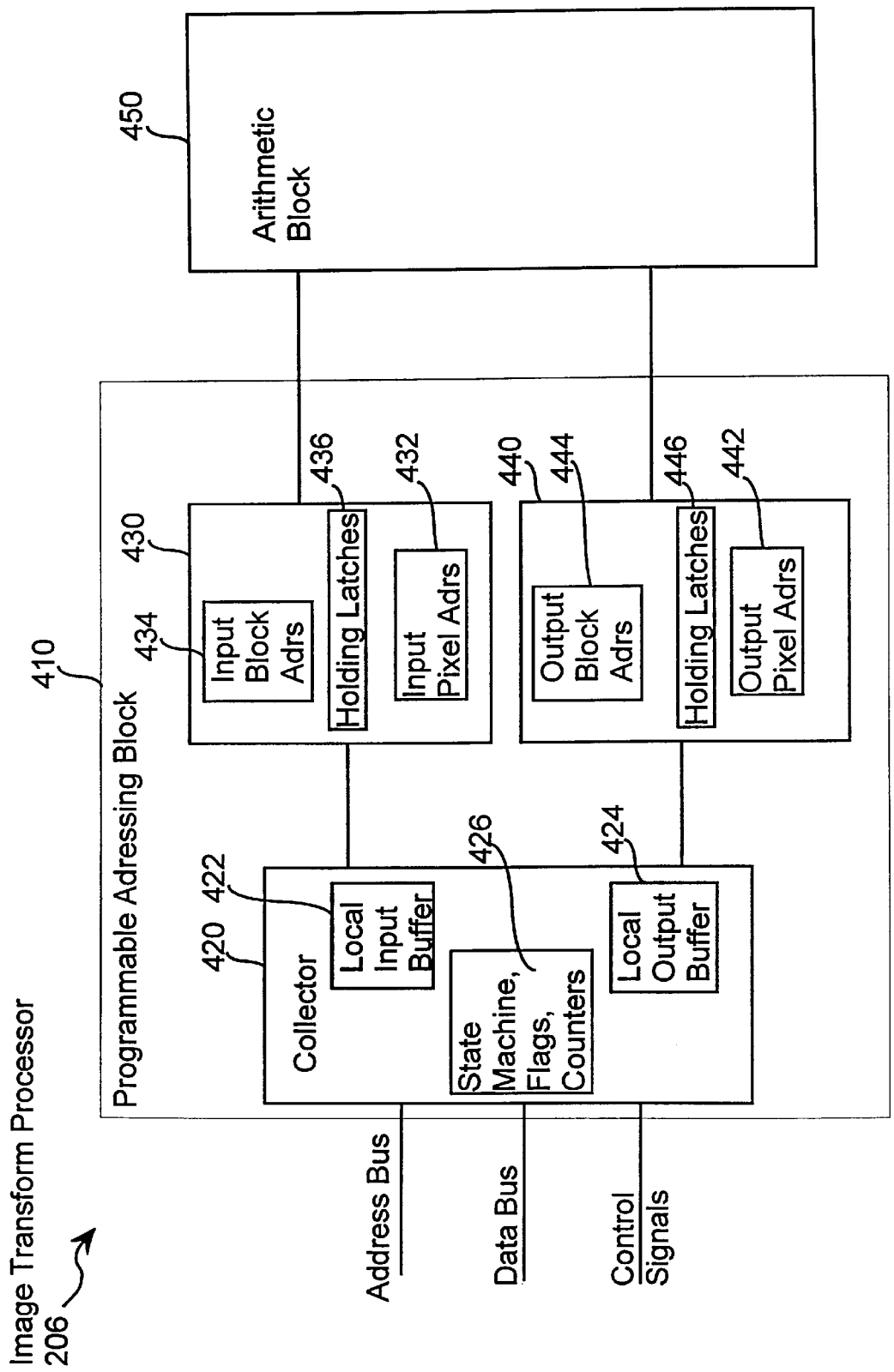
FIG. 4 is a block diagram of a preferred embodiment of the image transform processor of the present invention.

FIG. 4 is a block diagram of a preferred embodiment of the image transform processor (ITP) 206 of the present invention. Image transformation and compression operations, such as discrete wavelet transforms (DWT) and discrete cosine transforms (DCT) perform two main types of computation: address calculation and arithmetic computation. Digital cameras store images, at least temporarily, in solid-state memory such as a DRAM. The memory is organized into pages of data. To acquire data from the memory, an address must be calculated. After calculating the address and acquiring the desired data, the data is further manipulated. The image transform processor 206 partitions the address calculation from the arithmetic computation using parallel hardware. The image transform processor collects input data and output data in bursts when accessing the same memory page.

The ITP 206 has inputs and outputs for connecting to an address bus, a data bus and control signals. The ITP connects to the memory, the A/D converter, the timing generator and the camera's microprocessor. A DMA controller can be used to access the high speed image memory.

The ITP 400 comprises a programmable addressing block 410 and a programmable arithmetic block 450. The programmable addressing block 410 has a collector 420, an input addresser 430 and an output addresser 440.

Small buffers, i.e., holding latches 434 and 444, within the addressers 430 and 440 couple the collector 420 to the programmable arithmetic block 450. The holding latches 434 and 444 provide storage to overlap or pipeline the address generation, data gathering and image transformation operations. In other words, the arithmetic block 450 operates on the data stored in the holding latches 434 while the input addresser 430 and collector 420 gather additional image data to be processed. Similarly, the output addresser 440 and collector 420 stores data that has been processed while the arithmetic block 450 stores newly processed data in the holding latches 444.

The Collector

Figure 5A:
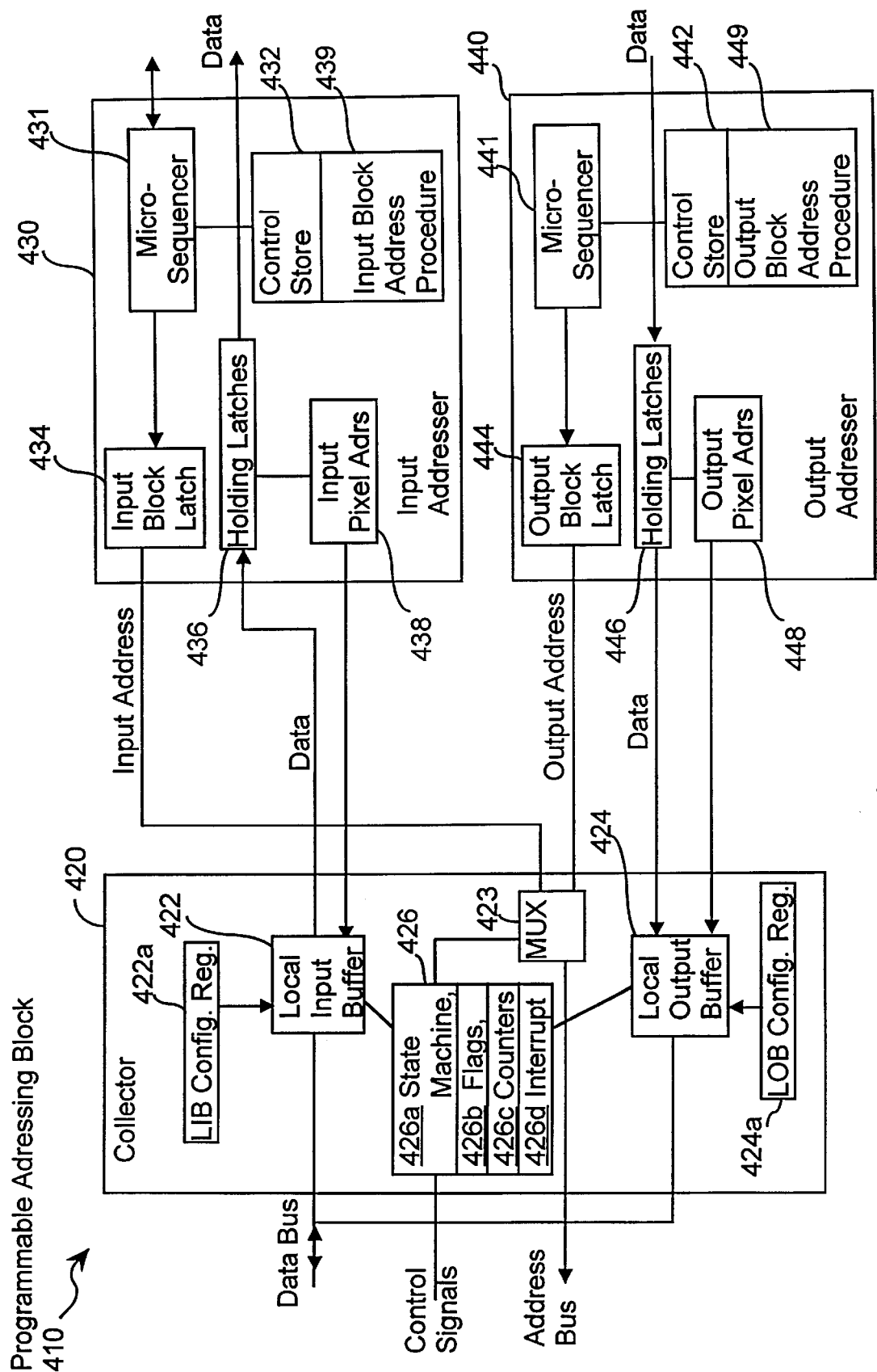
FIG. 5A is a detailed block diagram of the programmable interface block of the image transform processor of FIG. 4.

Referring to FIG. 5A, a block diagram of the programmable addressing block 410 of FIG. 4 is shown. The collector 420 has a local input buffer (LIB) 422, a LIB configuration register 422a, a local output buffer (LOB) 424, a LOB configuration register 424a and a control section 426 with a state machine 426a, flags 426b and counters 426c. The collector's control section 426 also has interrupt registers 426d to generate interrupts from the ITP which can be read or written by the camera's microprocessor. The local input buffer 422 and local output buffer 424 are sixty-four word buffers and are independently configurable using the LIB and LOB configuration registers, 422a and 424a, respectively. However, buffers of different size can be used in other embodiments. The local input buffer 422 is for storing requested data, i.e., data to be processed by the arithmetic block 450 (FIGS. 4, 6A). The local output buffer 424 is for storing data after processing by the arithmetic block 450.

The input addresser 430 and output addresser 440 supply an input and an output address, respectively, to a multiplexor 423 in the collector 420 which determines which address will be supplied to the address bus. The collector 420 supplies the input address to the address bus when retrieving data from memory, and supplies the output address to the address bus when storing data to memory.

The collector's control section 426 monitors the amount of data that has been read from the local input buffer 422 and stored into the local output buffer 424. The collector 420 determines whether the local input buffer 422 or the local output buffer 424 will be connected to the data bus.

The local input buffer 422 and local output buffer 424 can be dynamically configured into blocks, piles and words using the LIB and LOB configuration registers, 422a and 422b, respectively. The local input buffer 422 and local output buffer 424 store image data, i.e., sample values, which have a numerical format. The format of the image data can be configured as bytes, short integers and words. However, in other embodiments, other formats can be used. The local input buffer 422 and local output buffer 424 can be configured to a desired number of blocks. Each block stores at least one sample value. Blocks are configured or organized into piles. Each block has at least one pile, and each pile has at least one sample value. For example, each pile may store four sample values, and each block may store eight piles.

Figure 5B:
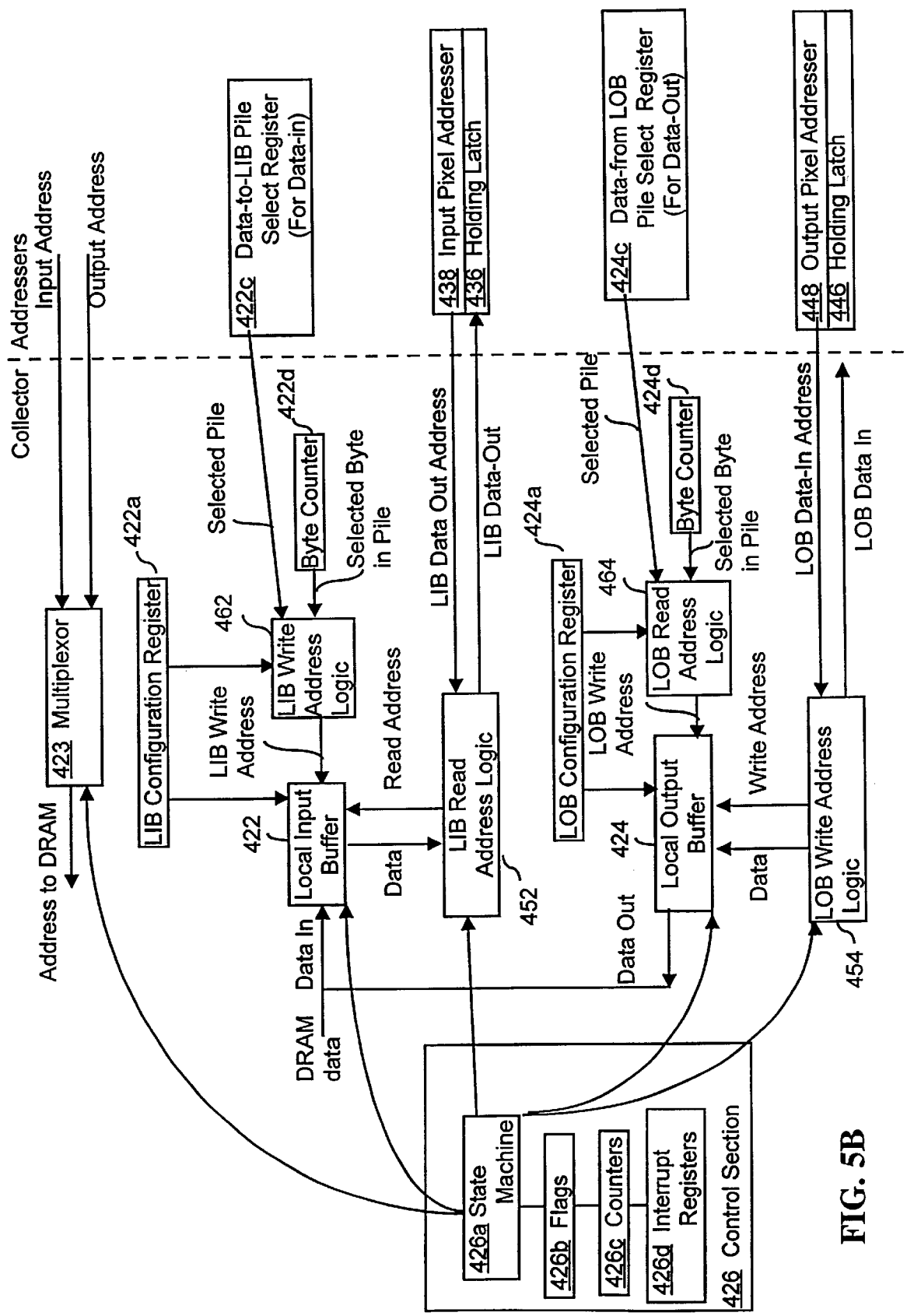
FIG. 5B is a detailed block diagram of the address and data paths of a collector.

Referring also to FIG. 5B, the LIB 422 is dual ported—one port receives data from the DRAM while the other port removes data from the LIB. The input addresser 430 specifies the pile where the requested word of data will be stored in the LIB 422 using a data-to-LIB pile select register 422c. The data-to-LIB pile select register 422c is loaded with the value of a desired pile and is incremented by one to point to the next pile after the pile is full. The input pixel addresser 438 specifies a pile address (called the LIB data out address) from which to take data from the LIB to the holding latch 436. The LIB read address logic 452 generates a read address at which to retrieve data in the local input buffer 422 based on the LIB data out address and the settings of the LIB configuration register 422a.

The LIB write address for DRAM data is supplied by LIB write address logic 462 based on the LIB configuration register 422a, the data-to-LIB pile select register 422c, and a byte counter 422d which specifies the particular byte in the pile to load. The control section 426 generates buffer access control signals for the LIB 422. If the pile selected by the input addresser 430 is full then the collector 420 will not request data from the DRAM.

The local output buffer 424 is also dual ported and operates in a similar manner to that of the local input buffer 422. The output addresser has an output pile select register 424c that interacts with the output address logic 424b, the LOB configuration register 424a, a byte counter 424d that supplies a byte address, and the control section 426 to generate control signals for the LOB to select the data word in the pile to output to the data bus. The output pixel addresser 448 generates a LOB Data-in address, i.e., a pile address, in which to store the data taken from the holding latch 446. The LOB write address logic 454 generates a write address at which to store data in the local output buffer 424 based on the LOB data-in address and the settings of the LOB configuration register 424a.

Each pile in the LOB 424 is associated with a flag 426b and the flag for that pile is set when the pile is full. The flags 426b will be further discussed below.

Using the LIB and LOB configuration registers, 422a and 424a, respectively, the local input buffer 422 and the local output buffer 424 are configurable to work in selected modes. The camera's microprocessor configures the collector 420 by storing desired values in the configuration registers 422a and 424a. Initially, the collector 420 is configured when power is turned on. The collector 420 configuration can be dynamically altered to support different image transform operations. The collector 420 configuration can be changed at times such as between exposures, before the exposure mode begins, after the exposure mode ends, and during post-processing of the image data.

Figure 5C:
FIG. 5C is a diagram of a collector configuration register.

Referring also to FIG. 5C, an exemplary collector configuration register is shown. Table 1 below describes the fields of the collector configuration register of FIG. 5C.

TABLE 1

Exemplary Collector Configuration Register Field Description

| Field Name | Description |
| --- | --- |
| BUFFER MODE | This field sets the buffer mode to one of the following: a FIFO mode, a FIFO with offset mode or a ping-pong mode. |
| MAX_PILE | The MAX_PILE field configures the buffer pointers, which sets the maximum number of piles for the local input or the local output buffer, the block addresser and the pixel addresser. In ping-pong buffer mode, this field sets the maximum number of piles in each half of the ping-pong buffer. The value of MAX_PILE ranges from one to seven. The configured number of piles is equal to one plus the value in MAX_PILE. |

Three exemplary collector 420 configurations are discussed below: FIFO mode, FIFO with offset mode and ping-pong mode. However, the invention is not meant to be limited three collector 420 modes. In other embodiments, the collector 420 may have one, two or four or more modes.

In a first exemplary collector 420 configuration, the local input buffer 422 and the local output buffer 424 can be configured to work in first-in-first-out (FIFO) mode, i.e., as a ring buffer. This mode is useful when data is fetched linearly from the image memory. The collector 420 provides one of the local input buffer pointers and the pixel input addresser 438 provides the other pointer.

In a second exemplary collector 420 configuration, the local input buffer 422 and the local output buffer 424 are also configurable to a FIFO with offset mode. The local input buffer 422 and the local output buffer 424 are operated as ring buffers. However, the pixel addressers 438, 448 of the addressing blocks 430, 440 have two pointers, a base pointer and an offset pointer. The collector 420 uses the base pointer to determine space available to load in new data. The offset pointer is used to address data.

In a third exemplary collector 420 configuration, the local input buffer 422 and the local output buffer 424 are configured as two-dimensional ping-pong buffers, i.e., buffers which are alternately used, having two blocks. Furthermore, in one embodiment, a block has thirty-two thirty-two-bit words. However, the number of blocks in each buffer and the words in each block may differ in other embodiments. Each block is organized into piles and the piles are addressable. For instance, the number of piles in a block is set using the MAX_PILE field of the LIB or LOB configuration registers 422a and 424b, respectively. The local input buffer 422 and local output buffer 424 can be configured as two blocks each having two piles of sixteen words, or two blocks each having four piles of eight words, or two blocks each having eight piles of four words. In addition, although buffer space is wasted, the programmable image transform processor supports blocks having three, five, six, or seven piles. In other embodiments, the local input buffer 422 and local output buffer 424 can be configured to have a single block, or more than two blocks, and a block may have a single pile or more than seven piles.

The Addressers

The input addresser 430 and output addresser 440 supply addresses to the address bus via the collector 420, and can supply addresses on demand. The input addresser 430 provides addresses of requested data to supply to the data bus, i.e., data to be operated on by the arithmetic block 450. In particular, the input addresser 430 generates DRAM memory word addresses for two-dimensional blocks or lines of image data. The output addresser 440 provides addresses of processed data to write to the data bus, such as data to be stored in the image-memory.

The Input Addresser

Figure 5F:
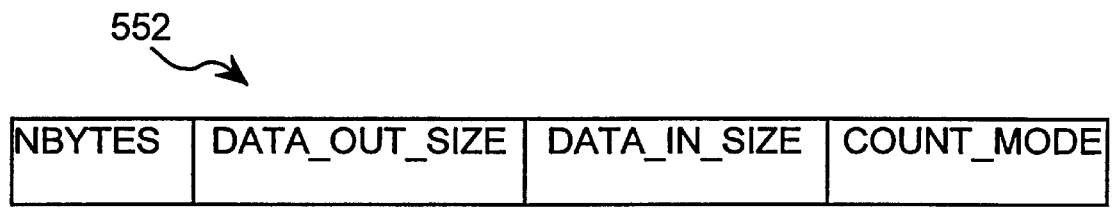
FIG. 5F is a diagram of a pixel addresser configuration register.
Figure 5D:
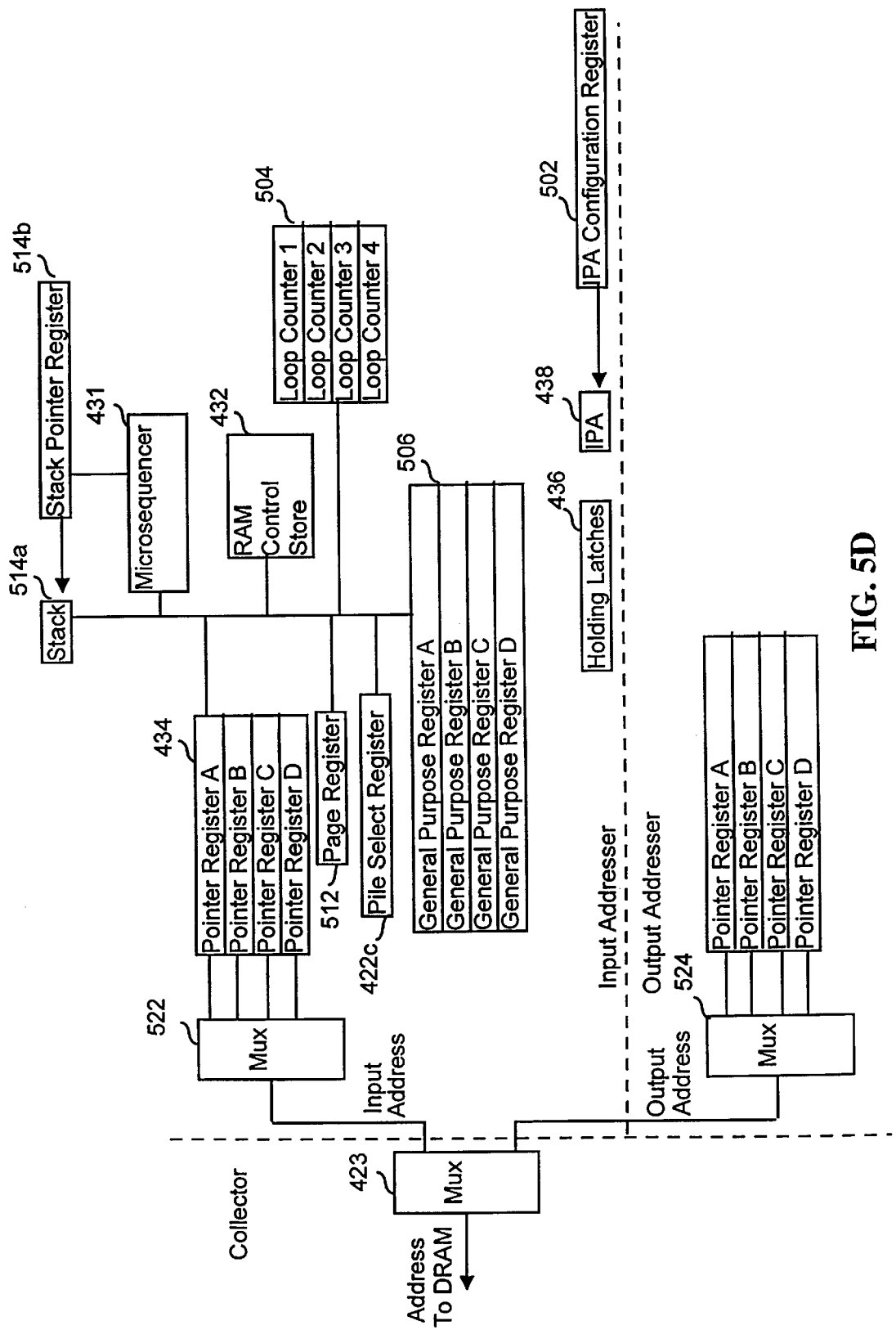
FIG. 5D is a detailed block diagram of an input addresser.

Referring to FIGS. 5A and 5D, the input addresser 430 is configurable, i.e., programmable. The input addresser 430 has a microsequencer 431, a control store or instruction memory 432, an input address latch 434 of pointer registers A, B, C and D, a plurality of holding latches 436, and an input pixel addresser (IPA) 438. The input addresser 430 has a memory-mapped configuration register 502 to configure the input pixel addresser 438, four loop counters 504, four general purpose registers 506, four pointer registers 434, and the pile select register 422*c*. Note that the input address latch 434 is implemented using pointer registers A, B, C and D. The input addresser 430 also has a page register 512 and a stack 514*a* and a stack pointer 514*b*. In one embodiment, the control store 432 has 128 twelve-bit storage locations. However, in other embodiments the control store may have a different size and width. The control store 432 is typically implemented using a static RAM array.

The microsequencer 431 is coupled to the control store 432 and input address latch 434. The input addresser 430 generates the input data addresses to access the memory, such as a DRAM, storing the image data. The microsequencer 431 stores the addresses in the pointer registers 434. The addresses in the pointer registers 434 are used to access the DRAM memory. Data requested by the input addresser 430 is stored in the local input buffer 422 of the collector 420. A multiplexor 522 selects the address in one of the pointer registers 434 to, output to the collector 420 based on commands executed by the microsequencer 431. As described above, the collector 420 determines whether the input or output address is output on the address bus, and supplies the chosen address using the multiplexor 423.

The control store 432 stores an input block address procedure 439 to be executed by the input addresser microsequencer 431. The input block address procedure 439 comprises a sequence of address generation instructions.

The input addresser 430 has a data request command to initiate read operations to the image memory and to supply an absolute address to the address bus via the collector 420. The microsequencer 431 can set a loop counter 504 to generate the desired number of request/acknowledge cycles. The microsequencer 431 loads and decrements the loop counter. The microsequencer 431 has other instructions. For instance, values can be added and subtracted from the pointer registers 434. Branching instructions can be responsive to the loop counter 504 and conditions. Call and return instructions are used with the stack 514*a* and stack pointer 514*b*. Push and pop instructions are also used to push and pop the values in the general purpose registers 506, pointer registers 434, and loop counter registers 504 on and off the stack 514*a*. The general purpose registers 506, pointer registers 434, and loop counter registers 504 can be loaded from other general purpose 506 and pointer registers 434. The contents of the general purpose 506, pointer 434, and loop counter 504 registers can be loaded with a constant value or added to each other. The pile select register 422*c* can be loaded with a value and incremented using LDPS and INC instructions, respectively, and described below. Table 2 describes a portion of the instruction set of the microsequencer 431.

TABLE 2

Input Addresser Microsequencer Instruction Set

| Instruction | Description |
|---|---|
| DRQ | The data request instruction supplies absolute addresses from a specified pointer register to the DRAM via the collector and initiates read and write operations. The addresser generates an address each time the DRAM acknowledges the current address. The value in the specified loop counter determines the number of addresses supplied. While supplying an address, the values in the specified pointer register and loop counter are adjusted. The adjustment of the loop counter is by subtracting a value of one. The adjustment of the pointer is determined by a field in the DRQ instruction that specifies a register. An immediate value of 0–7 can be added to the pointer, or the contents of a specified one of the general purpose registers can be added to the pointer. |
| MADDPT | The MADDPT instruction adds a value to a specified pointer register. This instruction is similar to the DRQ instruction except that no data is requested. An immediate value ranging from zero to seven can be added to the specified pointer register, or the contents of one of the general purpose registers can be added to the pointer register. |
| MSUBPT | This instruction subtracts a value from a specified pointer register. An immediate value ranging from zero to seven can be subtracted from the specified pointer register, or the contents of one of the general purpose registers can be subtracted from the pointer register. |
| LOOP | The loop instruction branches to a specified address when a specified loop counter register does not equal zero and decrements the loop counter. |
| LCI | This instruction loads a loop counter register with an immediate value. |
| BR | The branch instruction causes the microsequencer to execute the instruction at a specified address. |
| CALL | The call subroutine instruction calls a subroutine. The return address is pushed onto the stack and the microsequencer's instruction pointer is loaded with a specified address. A stack pointer register is also decremented. |
| LD | The Load Source to Destination instruction loads a specified destination register such as the one of the general purpose, pointer or loop counter registers from a specified source register such as one of the general purpose or pointer registers. |
| ADD | The add instruction adds the contents of the specified source and destination registers and stores the result in the destination register. |
| PUSH | Push decrements the stack pointer and writes the contents of the specified register onto the stack. |
| POP | POP writes the data pointed to by the stack pointer from the stack onto the specified register and increments the stack pointer. |
| LDPS | The load pile select register with immediate instruction stores a three-bit value in the pile select register to specify the pile number currently being processed in a transfer between the DRAM and the local input or output buffer. |
| INC | Increments any specified register. |
| LDMODE | Loads the Input Block addresser's Mode register with a three-bit immediate value. The arithmetic block has a branch instruction that tests the state of any one of the three bits. |
| SET | Sets the addresser's DONE flag in the collector's interrupt register to signal the end of an operation. |
| NOP | No operation |
| RET | Return from subroutine pops the stored instruction address from the stack and places the instruction address in the microsequencer's instruction pointer. |
| HALT | The halt instruction stops the microsequencer from executing the program in the control store. |

The camera's microprocessor loads the input addresser's 430 control store 432 with an input block address procedure 439 for each image transform operation. In response to the camera's microprocessor, the microsequencer 431 begins executing the input block address procedure 439 and generates the desired addresses.

The local input buffer 422 stores a block of data made up of bytes, short integers or words. The local input buffer 422 also organizes the data in both the horizontal dimension (within a pile) and the vertical dimension (between piles). The data stored in the local input buffer 422 can be addressed by byte, short integer and word in both the horizontal and vertical dimensions by the input pixel addresser 438.

The input pixel addresser 438 couples the collector's local input buffer 422 to the input of the arithmetic block 450. The input pixel addresser 438 can be configured to address bytes, short integers or words within the local input buffer 422 either by row or by column, i.e., in the horizontal dimension or vertical dimension. The input pixel addresser 438 controls the holding latches 436, to assemble columns of data. In one embodiment, the columns of data have up to four by eight pixels, i.e., thirty-two pixels. However, in other embodiments, the columns of data use a different number of pixels and have different horizontal and vertical dimensions. The input pixel addresser 438 is configured by the camera's microprocessor to supply pixels or groups of pixels to the arithmetic block 450 upon request. The input pixel addresser 438 supplies signed or unsigned pixels or groups of pixels to the arithmetic block 450 via the holding latches 436. In one embodiment the pixels have up to sixteen bits. However, the invention is not meant to be limited to pixels having sixteen bits. In other embodiments, pixels may have a different number of bits such as twenty-four bits.

The local input buffer 422 can be organized into blocks and each block can be organized into piles. In one example, the pixels are grouped into four rows of eight pixels. A block is a group of pixels arranged in the vertical and horizontal directions. For example, a block may be a group of pixels forming a "square," such as a four-by-four pixel group. The input pixel addresser 438 can address each pixel in the block, and also address a group of pixels in the block.

Figure 5E:
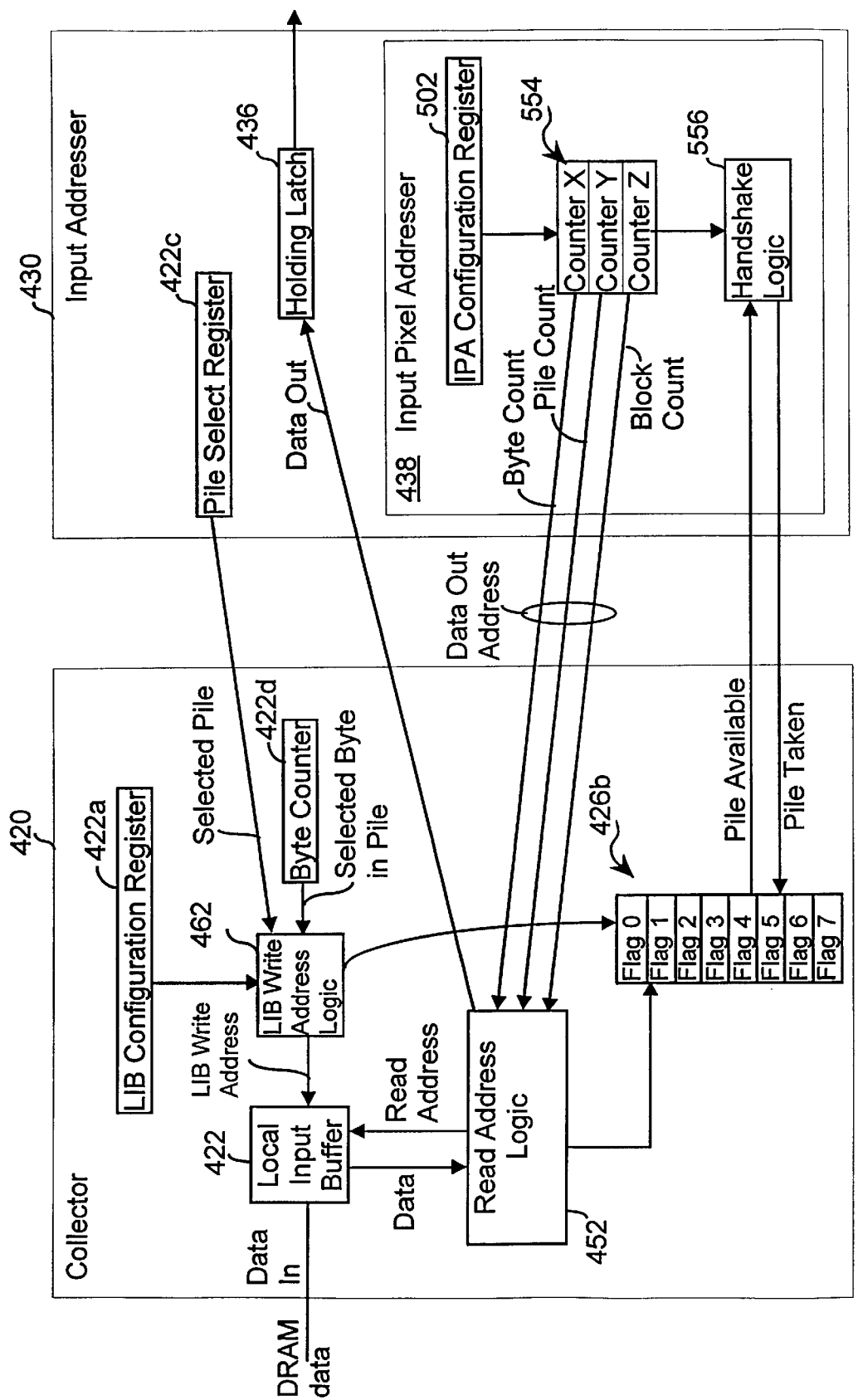
FIG. 5E is a detailed block diagram showing the flags and address logic of the collector's local input buffer and the input pixel addresser and holding latch.

Referring to FIGS. 5A and 5E, the input pixel addresser 438 controls what data is loaded into the holding latch 436 and when that data is loaded. The input pixel addresser (IPA) 438 has an IPA configuration register 502, counters 554, and handshake logic 556. The IPA configuration register 502 specifies whether the input pixel addresser 438 loads bytes, short integers or words from the local input buffer 422 to the holding latches 436. The IPA configuration register 502 also specifies a count mode for the IPA's counters 554. The count mode allows the IPA to count from zero to the desired number of bytes per pile then increment a pile counter (Counter Y), or to count from zero to the number of piles then increment a byte counter (Counter X). Note that for ping-pong mode counter Z of counters 554 counts blocks. The byte address of the last pixel in a pile can also be specified. Note that the counters 554 are updated based on the values stored in the BUFFER MODE and MAX_PILE fields of the LIB configuration register 422a.

In FIG. 5F, an exemplary input or output pixel addresser configuration register 502 is shown. Table 3 describes the fields of the pixel addresser configuration register 502.

TABLE 3

Description of Pixel Addresser Configuration Register

| Field Name | Description |
| --- | --- |
| COUNT_MODE | The COUNT_MODE has two bits and controls the counting sequence in the pixel addresser as follows:<br>00 Counts from zero to the number of bytes per pile then increments the pile counter to the next pile. The local input or output buffer is addressed from left to right, then from top to bottom.<br>01 Counts from zero to the number of piles then increments the byte counter. The local input or output buffer is addressed from top to bottom, then left to right. |
| DATA_IN_SIZE | The pixel addresser loads bytes, shorts or words from its local source into its holding register. For the input pixel addresser, the source of data is the local input buffer. For the output pixel addresser, the source of data is the arithmetic array. Two bits control the input as follows:<br>00 The pixel addresser loads in bytes (eight bits), four at a time.<br>01 The pixel addresser loads in shorts (sixteen bits), two at a time.<br>10 The pixel addresser loads in words (32 bits) one at a time. This mode is supported for the input pixel addresser and not the output pixel addresser. |
| DATA_OUT_SIZE | The pixel addresser transfers bytes, shorts, or words from its holding register to its local output. For the input pixel addresser, the output is the arithmetic array. For the output pixel addresser, the output is the local output buffer. Two bits control the output as follows:<br>00 The pixel addresser transfers out bytes, four at a time.<br>01 The pixel addresser transfers out words, two at a time.<br>10 The pixel addresser transfers out words, one at a time. |
| NBYTES | This field specifies the byte address of the first byte of the last pixel in a pile. For example, if the pile size is eight words (thirty-two bytes) and there are sixteen pixels in a pile (each pixel is sixteen bits wide), the last pixel in the pile uses bytes thirty and thirty-one. Therefore, NBYTES should be set to thirty. |

The camera's microprocessor loads the Input Pixel Addresser's 438 configuration register 502.

Referring back to FIG. 5E, the handshake logic 556 controls the flow of data between the collector's local input buffer 422 and the input addressees 430 holding latches 436. Additional handshake logic controls the flow of data between the holding latches 436 and the arithmetic block 450.

Each pile location in the LIB 422 has an associated flag 426b that indicates whether or not the pile currently stores data ready for transmission to the arithmetic block via the holding latches 436. For instance, flag 0 is associated with pile 0. The flags 426b are used by the read address logic 452 and handshake logic 556 to coordinate the data transfer using "pile available" and "pile taken" signals. In particular, the flag 426b for whichever pile is currently being addressed by the input pixel addresser 438 is output to the handshake logic 556 as a "pixel available" signal. When the handshake logic 556 receives a "pixel available" signal equal to a first value indicating that the addressed pile contains data, the handshake logic 556 transfers the data in the addressed pile to holding latch 436, and resets the flag 426b for that pile by sending a "pile taken" signal. The "pile taken" signal causes the read address logic 452 to reset the corresponding flag 426b so that the addressed pile is now considered to be "empty."

For purposes of acquiring data from the image memory, the input addresser 430 uses its pile select register 422c to specify the pile where the requested word of data is to be stored in the local input buffer 422. The LIB write address logic 462 sets the flag 426b for the specified pile when the data for that pile is stored in the LIB 422. As indicated above, when the input pixel addresser 438 addresses that pile, the flag 426b for the addressed pile is sent as a "pile available" signal to the handshake logic 556. The handshake logic 556 and read address logic 452 monitor the flags 426b in conjunction with the address specified by X, Y and Z counters 554 to allow data to be transferred from the specified pile to the holding latch 436 only when the addressed pile contains pixel data.

Those skilled in the art recognize that the local output buffer and output pixel addresser have similar components and operate in a similar manner to the local input buffer and input pixel addresser described above.

The Output Addresser

In the present invention, the output addresser 440 is a duplicate of the input addresser 430 shown in FIG. 5D except that the output addresser 440 takes data supplied by the arithmetic block 450 and stores that data in the local output buffer 424 of the collector 420. Therefore, the description for the configuration registers and microsequencer applies to the output addresser except as indicated below. In an alternative embodiment, the output addresser 440 can have different features from the input addresser 430 and therefore would not be a duplicate. Although the output addresser 440 is a duplicate of the input addresser 430 in a preferred embodiment, the output addresser 440 and the input addresser 430 perform different functions.

The output addresser 440 is configurable, i.e., programmable. Referring to FIG. 5A, the output addresser 440 has a microsequencer 441, a control store 442, an output address latch 444, a plurality of holding latches 446, and an output pixel addresser 448 in addition to other registers as described above for the input addresser 430. Like the input addresser 430, in one embodiment, the output addresser 440 has at least one loop counter, at least one general purpose register, and at least one pointer register. The output addresser 440 also has a four-bit constant page register and a seven-bit stack pointer. In one embodiment, the control store 442 has 128 twelve-bit storage locations, but the size of the size and width of the control store will vary in other embodiments.

The microsequencer 441 is coupled to the control store 442 and the output address latch 444. The output addresser 440 generates output data addresses to access the image memory (DRAM) when storing the image data. The output addresser 440 stores the data processed and output by the arithmetic block 450 into the local output buffer 424 of the collector 420.

The control store 442 stores an output block address procedure 449 to be executed by the output addresser microsequencer 441. The output block address procedure 449 comprises a sequence of address generation instructions.

The camera's microprocessor loads the output addresser's 440 control store 442 with an output block address procedure 449 for each image transform operation and for storing data received from the A/D converter into the image memory. In response to the camera's microprocessor, the microsequencer 441 begins executing the output block address procedure 449 and generates the desired addresses.

The output addresser 440 has a data request command to initiate write operations to the image memory and supply an absolute address to the address bus via the collector 420. The microsequencer 441 sets the loop counter to generate the desired number of request/acknowledge cycles. The microsequencer 441 can load and decrement the loop counter. The microsequencer has other instructions. Values can be added and subtracted from the pointer register. Branching instructions can be responsive to the loop counter and conditions. Call and return instructions are used with the stack. Push and pop instructions are also used to push and pop the general purpose, pointer, and loop counter registers on and off the stack. The general purpose, pointer, and loop counter registers can be loaded from the general purpose and pointer registers. The contents of the general purpose, pointer, and loop counter registers can be loaded with a constant value or added to each other. A pile select register can be loaded with a value and incremented.

The local output buffer 424 stores a block of data made up of bytes, short integers or words. The local output buffer 424 also organizes the data both in the horizontal dimension and in the vertical dimension. The data stored in the local output buffer 424 can be addressed by byte, short integer and word in both the horizontal and vertical dimensions by the output pixel addresser 448.

The output pixel addresser 448 couples the collector's 420 local output buffer 424 to the output of the arithmetic block 450. The output pixel addresser 448 can address bytes, short integers or words within the local output buffer 424 either by row or by column, i.e., in the horizontal dimension or vertical dimension. The output pixel addresser 448 controls the holding latches 446, to assemble columns of data. In one embodiment, the columns of data have up to four by eight pixels, i.e., thirty-two pixels. However, in other embodiments, the columns of data use a different number of pixels and have different horizontal and vertical dimensions. The output pixel addresser 448 is configured to receive bytes or short pixels from the arithmetic block 450 upon request. The output pixel addresser 448 supplies signed or unsigned pixels or groups of pixels to the local output buffer 424.

The local output buffer 424 can be organized into blocks and each block can be organized into piles. The pixels may be grouped into four rows of eight-pixels. For example, a block has a group of pixels forming a "square", such as a four-by-four pixel group. The output pixel addresser 448 can address each pixel in the block, and also address a group of pixels in the block.

The output pixel addresser has a configuration register. The configuration register specifies whether the output pixel addresser 448 loads bytes, short integers or words from holding latches 446 to the local output buffer 424. The configuration register also specifies a count mode, i.e., to count from zero to the desired number of bytes per pile then increment a pile counter, or to count from zero to the number of piles then increment a byte counter. The byte address of the last pixel in a pile can also be specified. The camera's microprocessor loads the configuration register.

Handshake logic is also used to control the flow of data between the output addresser's 440 holding latches 446 and the collector's 420 local output buffer 424, using the same pile flags and signals, except with the data flow in the opposite direction as for the input addresser. Additional handshake controls the flow of data between the arithmetic block 450 and the holding latches 446. Note that the holding latches 446 are implemented using a FIFO.

The Arithmetic Block

FIG. 6A is a detailed block diagram of the programmable arithmetic block 450 of FIG. 4. The holding latches (holding register) 436 of the input addresser are coupled to the multiplexer 608 of the arithmetic block 450 to input data or pixels to the arithmetic block 450. The holding latches 446 of the output addresser are coupled to the accumulator 680 to receive output data or pixels from the arithmetic block 450. The programmable arithmetic block 450 has a microsequencer 602 coupled to a memory, i.e., a control store 604, typically implemented using a static RAM array, and a coefficient memory 606. In one embodiment, the coefficient memory is part of the control store memory, but in other implementations the coefficient memory may be separate from the coefficient memory. The coefficients may be specified by "immediate values" embedded in very long instruction words (VLIW), as will be described in further detail below.

The arithmetic block 450 also has an arithmetic pipeline consisting of a sixteen-element 610*a* shift register 610, four twelve-by-sixteen multipliers 630–633 and one accumulator 680. The control store 604 stores an arithmetic block procedure 604, i.e., microcode. The microsequencer 602 executes the arithmetic block procedure 605 which comprises a set of microcode instructions. The microcode controls the input to the shift register 610, inputs to the multipliers 630–633, and whether to load or add to the accumulator 680. The microcode also controls histogram and lookup table functions which will be discussed below. The arithmetic block 450 also has two twelve-bit loop counters 681*a*, 681*b*, and one eight-bit loop counter 681*c*. The arithmetic block 450 can perform four multiply accumulates on each clock cycle or phase.

The microsequencer 602 is also coupled to a multiplexor 608 for inputting data. The holding latches 436 of the input block addresser 430 input data to the arithmetic block 450 though the multiplexor 608. The multiplexor 608 is coupled to a shift register 610. The shift register 610 is a barrel shift multiplexor. The multiplexor 608 can be programmed to input pixel data from the holding latches 636 into the shift register 610 in a predetermined shift size, up to four bytes for byte-pixels and two shorts for short-integer-pixels. The shift register 610 is coupled to four multiplexors 620–623. The output of each of the four multiplexors 620–623 is coupled to an input of one of the four multipliers 630–633, respectively. The other input of each of the four multipliers 630–633 is coupled to the coefficient memory 606. Alternately, the other input of each of the four multipliers 630–633 is coupled to a pipeline register, discussed below, that stores the coefficients. A coefficient is supplied to each of the four multipliers 630–633. The output of four multipliers 630–633 is coupled to latches 640–643. The output of a pair of latches, i.e., latches 640 and 641, and latches 642 and 643 is supplied to adders 644, 645 respectively. The output of the adders 644 and 645 is supplied to latches, 646, 647, respectively. The output of latches 646 and 647 is supplied to adder 638. The output of adder 638 is supplied to a latch 650. The output of latch 650 is coupled to an adder 660 and a multiplexor 670. The output of adder 660 is coupled to the other input of the multiplexor 670. The output of the multiplexor 670 is coupled to accumulator 680. The output of the accumulator 680 is input to the adder 660 and can be scaled. The output of the accumulator 680 is also input to the holding register 446 of the output addresser 440 and eventually output to the local output buffer 424 of the collector 420.

The arithmetic block also has a configuration register 682 and range registers 684. The range registers 684 include an upper range register 685 and a lower range register 686 which are used to check the accumulator output and limit the accumulator value to a specified range of values.

In FIG. 6B, the fields of the arithmetic block configuration register 682 are shown and Table 4 describes the fields.

TABLE 4

Description of Arithmetic Block Configuration Register

| Field Name | Description |
|---|---|
| SHIFT SIZE | This field specifies the number of elements shifted into the input shift register 610 each time a shift operation is performed by an arithmetic block instruction and is set to one, two or four. Each element in the shift register 610 is sixteen bits wide, but the pixel data being shifted in can be eight or sixteen bits. A "one" shifts in one element per shift instruction. A "two" shifts in two elements per shift instruction. A "four" shifts in four elements per shift instruction. The input pixel addresser's configuration register has a data out size field that is configured to provide the data for each shift operation. For example, if the shift size is set to two and the data size is set to sixteen (in the 8bit/16bit field described below), the input pixel addresser's data out size should be configured to a word size of thirty-two bits. |
| DESCALE MODE | If this field is set to 00, the accumulator output is rounded up as specified in the descale shift configuration field. If set to 01, the accumulator output is truncated according to the descale shift configuration field. |
| DESCALE SHIFT | This field specifies the number of bit positions to descale output. A setting of zero means no descale operation is done. A setting from one to thirty-one shifts the accumulator bits right by the specified number of bit positions before the data leaves the arithmetic block. |
| 8bit/16bit | This field specifies whether the input data is eight or sixteen bits wide. Eight-bit input data is padded with zeroes to fill in all sixteen bits of the element of the input shift register 610. |
| Signed/unsigned | Indicates whether the input data is signed or unsigned. |
| Hist Bit Select | Used to select sets of bits in the accumulator to histogram. For example, 00 means to histogram bits 7:0 of the accumulator if 256 bins are specified, and to histogram bits 7:2 of the accumulator if sixty-four bins are specified. |
| Hist 256 bits | When set to zero, generates up to four histograms having sixty-four bins when capturing an image. When set to one, generates a single histogram having 256 bins. |
| Hist All Enable | Enables the generation of a histogram for all output data. This bit should be cleared during image capture. During capture, histogramming can be controlled dynamically by very long instruction word (VLIW) instructions. |
| UPPER BOUND CHECK | When set, the accumulator output is checked against the specified range in the upper range register. If the accumulator output exceeds the upper bound, the accumulator output is set to the upper bound. |
| LOWER BOUND CHECK | When set, the accumulator output is checked against the specified range in the lower range register. If the accumulator output is less than the lower bound, the accumulator output is set to the lower bound. |

Figure 6C:
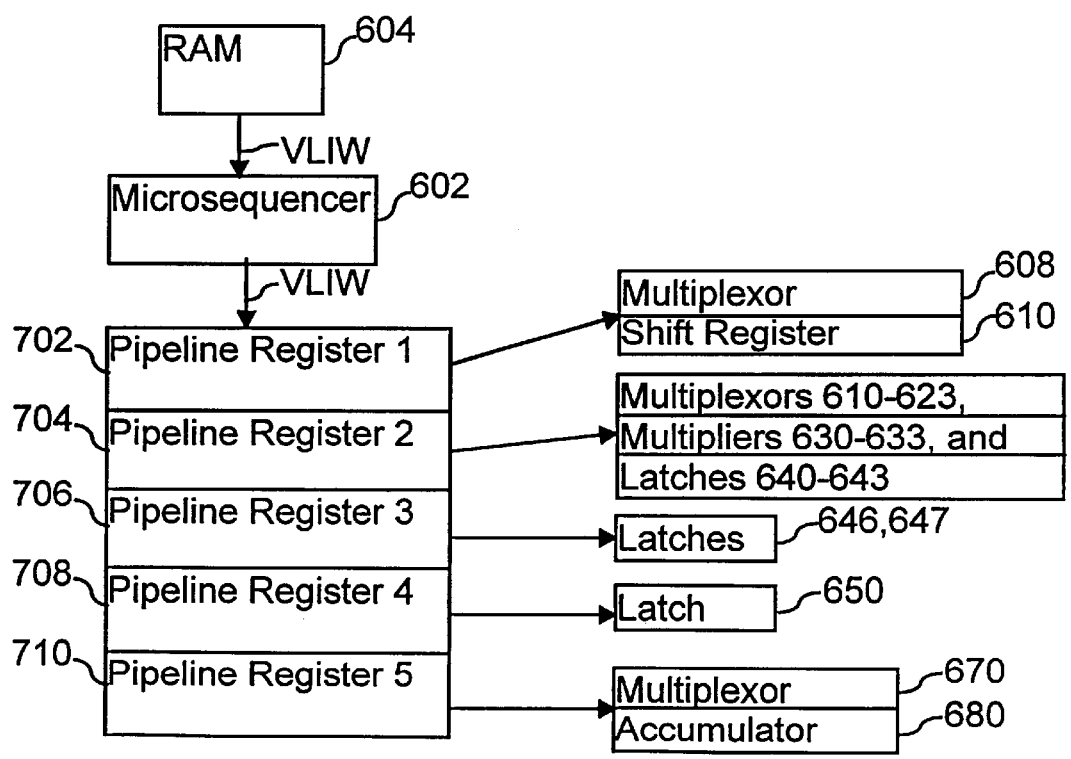
FIG. 6C is a diagram of the pipeline registers associated with different portions of the arithmetic block.
Figure 6A:
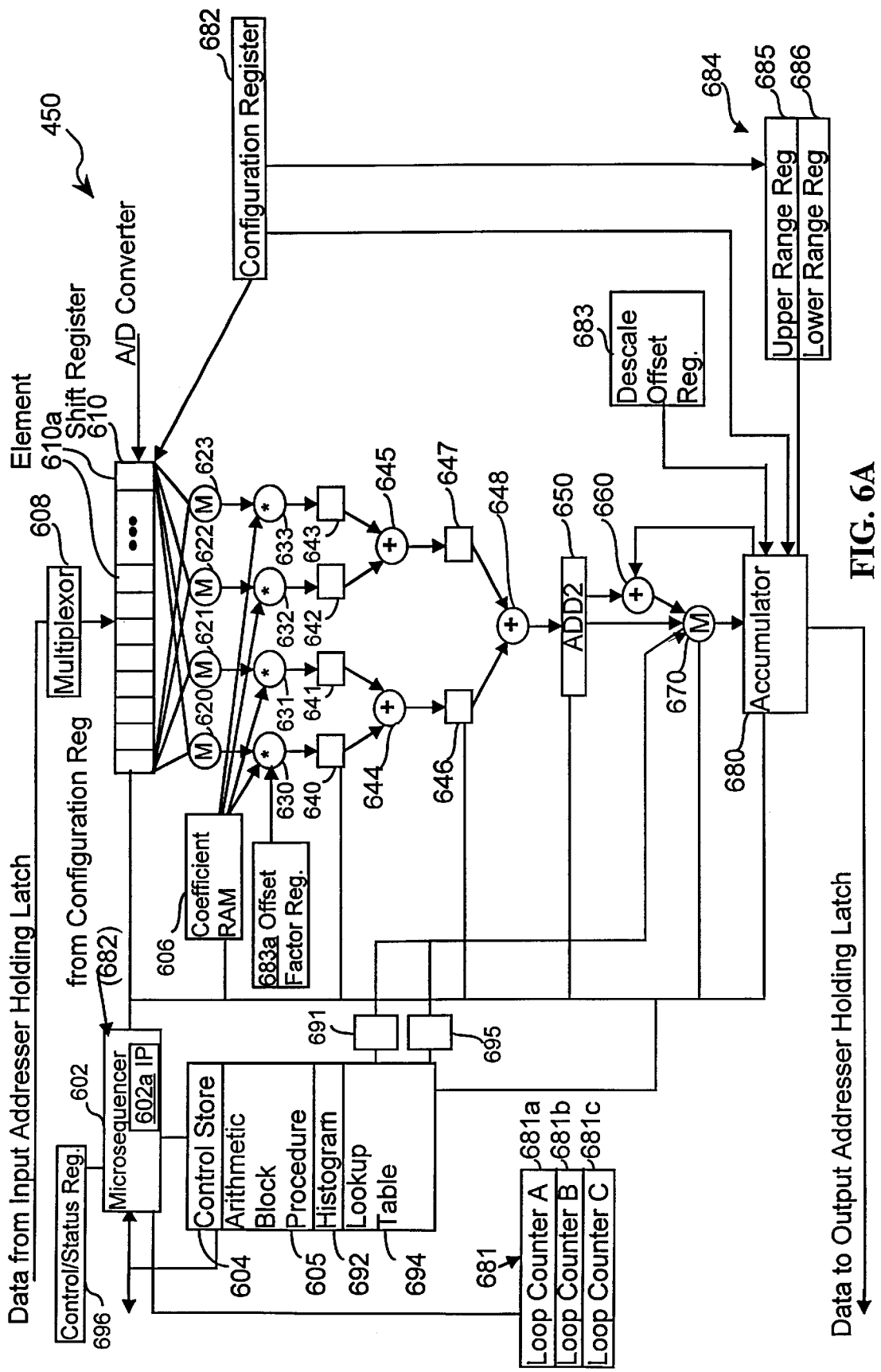
FIG. 6A is a detailed block diagram of the arithmetic block of the image transform processor of FIG. 4.

Referring also to FIG. 6C, the arithmetic block is pipelined and has five stages and each stage has a corresponding phase. The VLIW instruction word for the input data that is stored in the control store 604 follows the input data as the input data passes through each stage of the pipeline. The arithmetic pipeline has five pipeline registers 702–710 to store the instruction word for each stage of the pipeline and the instruction word passes from register to register following the data. The microsequencer 602 loads a VLIW instruction word from the control store 604 into a first pipeline register 702. In one embodiment, in phase one, the first pipeline register 702 decodes the VLIW instruction word, and controls the input from the multiplexor 608 to the shift register 610. In phase 2, the second pipeline register 704 stores the VLIW and controls the multipliers, i.e., what is input to the multipliers 630–633 from multiplexors 620–623 and the coefficients. The VLIW instruction word also controls the input of the coefficients from the instruction word into the multipliers 630–633. The second pipeline register 702 latches the coefficients in the VLIW instruction. The third pipeline register 706, for phase three, controls latches 646 and 647 to store the intermediate results of the multiply/add operation. The fourth pipeline register 708, for phase 4, controls the latch 650 to store the final result of the multiply/add operation. The fifth pipeline register 710 in the fifth stage, for phase five, controls the multiplexor 670 and the accumulator 680, i.e., what is input to or added to the contents of the accumulator 680. The output of adder 660 may be loaded in the accumulator 680. The output of the latch 650 may be loaded in the accumulator 680. The output from the histogram 692 or lookup table 694 may be loaded to the accumulator 680. Therefore, via the VLIW and the pipeline registers, the microsequencer 602 controls the multiplexor 608, the shift register 610, the coefficient RAM 606, the latches 640–643, latches 646, 648, latch 650, multiplexor 670 and the accumulator 680. A phase clock determines each phase.

The entire VLIW instruction word is not transferred to all pipeline registers 702–710. Only the necessary bits to operate subsequent stages are transferred. For instance, the coefficients that are used in stage two in pipeline register two 704 are not transferred to pipeline register three 706.

The arithmetic block 450 is programmable and can be programmed to perform many operations on the data such as a wavelet transform, eight-by-eight DCT, or four-by-four kernel filtering. The arithmetic block 450 has very long instruction word and a single instruction on group data (SIGD) format. The VLIW is seventy-two bits wide. Data can be simultaneously shifted into the arithmetic block 450, multiplied by coefficients stored in pipeline register two, loaded into an accumulator 680 and scaled at the output. The multiplexers 620–623 can couple the output from any four elements of the shift register 610 to the desired multiplier. The VLIW is used to specify the coefficients, the input selection for the multipliers 630–633, and the operation to be performed. The arithmetic block 450 stalls when it is unable to shift in input pixels or store output pixels. The arithmetic block 450 also has configuration options for saturation arithmetic and rounding.

The shift register 610 is used to input data into the multiplexers 620–623. The length of the input shift can be specified by pixel. The length of the shift is specified from the configuration register 682 or from the VLIW. The length of the input shift can be specified in units of pixels, up to four for byte-pixels, and up to two for short-integer-pixels. The input data can be specified as signed or unsigned and whether the input data is eight bits or sixteen bits. When loading data from the holding latches 436, the amount of shift from the holding latches 436 into the shift register 610 can be preconfigured.

Referring back to FIG. 6A, the accumulator 680 can be programmed to operate in a descale mode to descale the accumulator's 680 output. A descale shift value, i.e., the number of bit positions to descale, can be set in the configuration register 682. The accumulator 680 descales up to thirty-two bit positions. The accumulator 680 can be programmed to round up or truncate its contents according to the descale shift value. The accumulator 680 can also be programmed to add a desired descale offset value stored in a descale offset register 683 to its contents.

The arithmetic block 450 also executes branching instructions. The branch instructions affect the loop counters, the shift register 610 and a last pixel flag.

The arithmetic block 450 also has programmable range registers 684 which can be loaded with values representing an upper and lower limit, and the value stored in the accumulator 650 can be checked against those limits. If the value in the accumulator is outside the limit, the accumulator can be forced to output the selected limit. The programmable range registers 684 operate as specified by the arithmetic block's configuration register 682.

The arithmetic block 450 is also coupled to the A/D converter to receive input image data (pixels). A pixel clock signal from the timing generator is used to synchronize the transfer of input image data from the A/D converter to the arithmetic block 450. In one embodiment, one of the multipliers 630–633 receives the input image data. In an alternative embodiment, the shift register 610 receives the input image data. In another alternative embodiment, one of the multiplexers 620–623 receives the input image data. In other alternative embodiments, multiplexer 608, one of the latches 640–643, one of the latches 646, 648 or latch 650 receives the input image data.

As shown in FIG. 6D, the Arithmetic block 450 has a control and status register 696. Table five below shows the fields of the control and status register 696.

TABLE 5

Fields of the Arithmetic Block Control and Status Register

| Field Name | Description |
|---|---|
| IP | This is the arithmetic block instruction pointer (IP) register 602a to the control store 604. The camera's main microprocessor can write to this field when the arithmetic block is halted. |
| DP | The debug instruction pointer is used for debugging. If the BREAK bit (described below) is set, the debug mode is enabled and the value of DP is compared with the IP field during the execution of the arithmetic block microcode. If the value of DP equals the value of the IP, the arithmetic block halts the execution of the microcode. |
| CW | The Control Word Select field selects the type of control word instruction executed by the arithmetic block: CW0 - Control word 0 is used for multiply and accumulate instructions. CW1 - Control word 1 is used for bit select instructions. |
| FLUSH | Writing a one to the FLUSH bit position empties (flushes) the arithmetic block pipeline registers. |
| DEBUG | This bit is used for simulation only and not in the actual hardware. |
| BREAK | The camera's microprocessor sets or clears this bit to enable or disable the debug instruction pointer. |
| HALT | Setting the HALT bit causes the block addresser to halt. This bit is set to allow the camera's microprocessor to load the block addresser control store memory. Halt should be toggled only as an operation by itself. It should not be combined with changes to other fields in the control and status register. |

The VLIW has three instructions: Branch, Control word 0 and Control word 1. Control word 0 instructions are used to shift data into the arithmetic bock pipeline and to perform mathematical operations on the contents of the shift register. Control word 1 instructions are used to obtain bit data statistics for data compression algorithms. Control word 0 and control word 1 instructions cannot be used together in any particular instruction stream.

Control Word 0 Instructions
Inputs to the Multiplier: the Coef and Msel Fields FIG. 6E shows the fields of a control word 0 instruction. The multiplier select (msel) fields controls the input from the shift register 610 to a particular multiplier. For instance the msel3 field controls the input for multiplier three 623. The msel0, msel1, msel2 and msel3 fields are each four bits and are used to select one element of the sixteen element shift register for input to the associated multiplier. The other input to a multiplier 623 is supplied by a coefficient field, coef0, coef1, coef2 and coef3, in the control word 0 instruction. The coefficient field is twelve bits wide and supplies the coefficient to another input of the multiplier. For instance, coef3 is supplied to the other input to multiplier three, and multiplier three will generate the product of the values stored in coef3 and the element designated by msel3.

The Control Word Field Bits

FIG. 6F shows the various bits of the control word field of the control word 0 instruction of FIG. 6E. Table 6 below describes the fields and bits of the control word field shown in FIG. 6F.

TABLE 6

Description of Control Word 0 Field Bits

| Bit Name | Description |
|---|---|
| SHF (Shift in data) | If this bit is set in the control word, and if the input pixel addresser has data available, data is loaded or "shifted" from the holding register into the shift register 610. |
| ADO (Add offset) | If the Add Offset bit is set, then the input from the shift register 610 to multiplier 0 is disregarded. Multiplier 0 will multiply the value of coef0 by the offset factor loaded into the offset factor register 683a. When the add offset (ADO) bit is set, multiplicand 0 is used as an offset factor and loaded into the offset factor register instead of a shift register element. |
| MUL (Multiply and add) | If the multiply and add (MUL) bit is set, the multiplier latches 640–643 are loaded with the respective products, latches 646, 647 and 650 are also summed. |
| LDA (Load Accumulator) | If this bit is set in the control word, the accumulator 680 is loaded with the value in latch 650. |
| ADA (Add accumulator) | If this bit is set in the control word, the sum of the accumulator 680 and the latch 650 is stored in the accumulator 680. |
| LDO (Load Output) | If the LDO bit is set, an "AA pixel valid" signal is asserted when the multiply-and-add result is available in the accumulator 680. The pipeline then stalls until the output pixel addresser takes the data from the accumulator. For control word 0, the output data can be configured to be eight or sixteen bits. This output data is the value in the accumulator, rounded or truncated to eight or sixteen bits, and conditioned by the bounds checking logic in the configuration register. |
| CAP (Capture data from image sensor) | When the capture (CAP) bit is set, multiplier one 631 receives the incoming data from the image sensor instead of receiving data from the input shift register 610. When the capture bit is set, the msel1 field in the VLIW can be used to configure the histogram logic to generate a histogram of the incoming data. |

Control Word 1 Instructions

FIG. 6G shows the fields of a control word 1 instruction. Table seven below describes those fields. The control word 1 instruction format is active when the CW field in the control and status register is set to 01. Control word 1 instructions are used to perform bit selection and to generate run-length statistics.

Data is shifted into element zero of the input shift register 610. The multiply and accumulate pipeline of the arithmetic block is not used. Instead, logic performs two operations called Load Y (LDY) and Load M (LDM) which will be explained below and which generate a single bit result. This result is transferred to an output shift register. In one embodiment, the accumulator 680 also acts as the output shift register.

TABLE 7

Description of Control Word 1 Fields

| Name | Description |
|---|---|
| BIT SELECT | This field is used to select a bit by the LDY instruction. |
| BIT MASK | This field is used to determine which bits of an input value are to be logically OR'd when the LDM bit is set. |
| SHF | If the Shift in (SHF) bit is set in the control word, and if the input pixel addresser has data available, a shift from the input pixel addresser holding register into the input shift register 610 will occur. The shift size and data size are preconfigured in the configuration register of the arithmetic block and input pixel addresser configuration register. |
| LDOS | If the load output shift register (LDOS) bit is set, a pixel valid signal is asserted when the result becomes available at the accumulator 680. The pipeline stalls until the output pixel addresser removes the data from the accumulator 680. |
| LDY | If the load Y (LDY) bit is set, the value of a selected bit is shifted into the output shift register (accumulator) 680. The BIT SELECT field above in control word 1 is used to select the bit. |
| LDM | If the load M (LDM) bit is set, an OR operation of all bits in the input value that match the bits equal to one in the BIT MASK field of the control word 1 instruction is performed. For example, if the BIT MASK field is 0x0F, the arithmetic block OR's bits zero, one, two and three of the input value. The single bit result is shifted into the output shift register. If the LDY and LDM bits are both set, then both operations are performed, and two bits are shifted into the output shift register. The LDM result is shifted in first, then the LDY result. |
| SAM | If the sign and magnitude (SAM) bit is zero, the LDY or LDM operation is performed directly on the sixteen bit input value. If set to one, the arithmetic block converts the sixteen bit input value from two's complement to sign-and-magnitude format. The LDY or LDM operation is then performed on the sixteen-bit sign and magnitude format. |

Image Acquisition

To acquire an image, the camera's microprocessor loads an arithmetic block procedure for controlling the elements of the arithmetic block 450 to pass the acquired (captured) image data. The camera's microprocessor also loads the output addresser 430 with an output address block procedure to generate addresses at which to store the acquired image data. The camera's microprocessor halts the microsequencers of the arithmetic block 450 and the output addresser 430 while loading the procedures in the respective control stores. The camera's microprocessor releases the microsequencers and the microsequencers will execute the loaded procedures and the handshaking logic between the output addresser and the arithmetic block will cause the data to be transferred from the arithmetic block 450 to the output addresser. The camera's microprocessor initiates the data transfer from the A/D converter to the arithmetic block 450.

The arithmetic block can be programmed to combine image data stored in the image memory (accessed via the input addresser) and data from the A/D converter. In addition to loading the arithmetic block and output addresser control stores, the camera's microprocessor will load the input addresser's 430 control store with an input block address procedure, and release the input addresser's microsequencer from the halted state. The input addresser will generate addresses and fetch the data. The data will be input into the arithmetic block shift register. Meanwhile data from the A/D converter is input into one of the multipliers 630–633. Responding to the instructions in the VLIW, the elements of the arithmetic block will multiply the input data from the A/D converter by a coefficient, and add or subtract the data from the input addresser from the data from the A/D converter. The data from the input addresser and the data from the A/D converter can be combined to perform a desired image transform.

Operation

The camera's microprocessor loads the control stores of the input addresser 430, output addresser 440, and arithmetic block 450 with the input address generation procedure, the output address generation procedure and the arithmetic procedure, respectively. The camera's microprocessor Also loads an instruction pointer in each of the microsequencers with the starting address of the loaded procedures. The control stores can be loaded to do an image transform operation. The control stores can be loaded initially when the camera is turned on, before image acquisition, between successive exposures when acquiring an image, and for each image transform operation. The procedures can be modified during the time between successive exposures. The procedures can also be changed by the camera's microprocessor by halting the microsequencers. When the microsequencers 431, 441 and 602 are released from the halt state by the camera's microsequencer, the microsequencers 431, 441 and 602 will execute the loaded procedures from their respective control stores. Halting and releasing of the microsequencers 431, 441 and 602 does not have to be done simultaneously. Preferably the input addresser's 430 microsequencer 431 is released before the arithmetic block's 450 microsequencer 602.

The arithmetic block 450 processes data concurrently with the data gathering and storage function of the programmable addressing block 410. The arithmetic block 450 is responsive to the input addresser 430 and output addresser 440. The arithmetic block 450 stalls when it is unable to shift in input pixels from the holding latches 436 or store output pixels to the holding latches 446. This will occur if the local input buffer 422 becomes empty or the local output buffer 424 becomes full. The microsequencers 431, 441 and 602 can all be interrupted or arbitrarily stopped during any input, output or concurrent operation sequence prior to normal completion. The input addresser 430 and output addresser 440 interrupts the camera's microprocessor to indicate completion of a given block address procedure 439, 449. The arithmetic block 450 requests input pixels from the holding latches (register) 436 using handshaking logic with the input pixel addresser 438 to transfer the data. The arithmetic block 450 also uses handshaking logic with the output pixel addresser 448 to request output pixels be transferred from the accumulator 680 to the holding latches 446.

The image transform processor can be programmed in many ways. The image transform processor can be programmed to re-order the data stored in the local input buffer 422 and store the reordered data in the local output buffer 424 by sending the data through the arithmetic block without modification. The image transform processor can be programmed to alternate between a plurality of input sequences when transferring data from the local input buffer 422 to the shift register 610. The image transform processor can be programmed to alternate between a plurality of output sequences when transferring data from the arithmetic block 450 to the local output buffer 424.

Lookup Table

The arithmetic block 650 has a lookup table function. Data, a pixel value, is loaded in the accumulator 680 in stage five. In response to an instruction in the VLIW stored in pipeline register five, the value of the data stored in the accumulator 680 is input, via lookup logic 695, as an address to the Lookup table 694 portion of the control store 604. The lookup logic 695 also outputs the contents of the addressed location in the Lookup table 694 to the accumulator 680. Alternatively, the contents of the addressed location in the Lookup table 694 is output to the latch 650.

Histogram

The arithmetic block 450 also has a histogram function. Histogram control logic 691 is coupled between the accumulator 680 and the histogram portion of the control store 692. The histogram control logic 691 and the accumulator 680 are responsive to the fifth pipeline register which has a histogram bit to enable the histogram operation. Similar to the lookup table above, in stage five, the histogram control logic 691 uses the value stored in the accumulator 680 to address the histogram portion of the control store. The histogram control logic 691 reads the contents of the addressed memory location, increments the contents by one and stores the incremented value back in the addressed memory location.

Three fields in the arithmetic block configuration register 682 control the generation of the histogram. The Hist All Enable bit enables or disables the histogram function. The Hist 256 Bins bit selects the size of the histogram to be either 64 or 256 bins. The Hist Bit Select field specifies the bit range, and the distribution of output values into the bins.

When the Hist All Enable bit is set to one, a single histogram is generated for all values output by the accumulator 680. When not capturing data from the A/D converter, the Hist All Enable bit should be set to one.

In capture mode, when the CAP bit is set and when the histogram size is set to 64 bins, the Hist All Enable bit should be zero and the msel1 field in the VLIW control word controls the histogram operation. One of the bits in the msel fields enables the histogram function for the data sample, and another pair of the msel bits select one of four separate histograms to be affected by that data sample. For example, a separate histogram for red, green and blue pixels can be generated using the msel bits.

The camera microprocessor accesses the histogram 692 portion of the memory of the arithmetic block 450 control store 604 to retrieve the histogram information.

Figure 7:
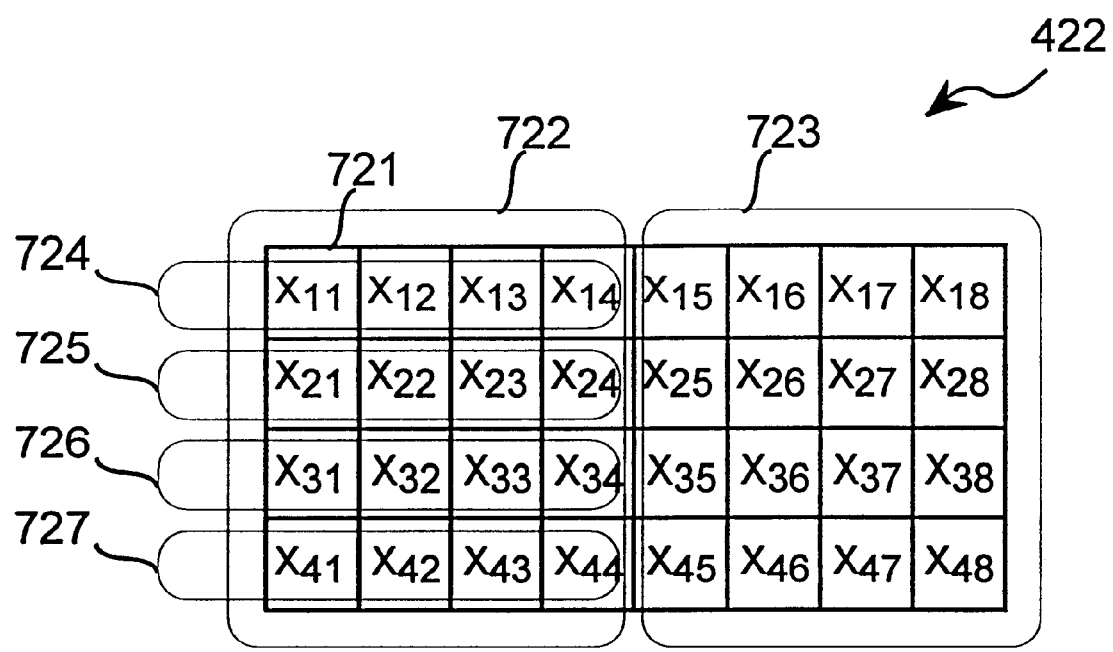
FIG. 7 is an exemplary configuration of the local input buffer and input pixel addresser.

FIG. 7 is an exemplary configuration of the local input buffer 422. The local input buffer 422 stores thirty-two pixel values $X_{ij}$ 721 of image data. Following the organization of the image sensor, the pixel values 721 are organized in horizontal and vertical dimensions. The local input buffer 422 is configured to have two blocks 722 and 723. Each block 722 and 723 stores a subset of pixel values in the vertical and horizontal dimensions, and has sixteen pixels. The pixels 721 in each block 722 and 723 are further organized into piles 724–727. The piles 724–727 are organized in the horizontal dimension of a scan line and have four pixel values. For example, pile 724 has pixel values $X_{11}$, $X_{12}$, $X_{13}$, and $X_4$. The piles can also be organized in the vertical dimension. The input pixel addresser 438 can address data by block, pile and pixel.

The local output buffer can be configured in a manner similar to the local input buffer.

The following example will illustrate one computation of the arithmetic block 650 using the pixel notation of FIG. 7. The sixteen pixels $X_{i,j}$ of block 722 are loaded into the holding latches 436 and input into the shift register 610 of the arithmetic block 450. Assume a Laplacian filter operation will be performed to identify a sharp edge in the image. The Laplacian filter uses a three-by-three subset of pixel values. In the horizontal direction, the filter formula is:

$$Yh_{i,j} = -X_{i-1,j} + 2X_{i,j} - X_{i+1,j}.$$

In the vertical direction, the filter formula is:

$$Yv_{i,j} = -X_{i,j-1} + 2X_{i,j} - X_{i,j+1}.$$

The result Y is equal to:

$$Y = Yh_{i,j} + Yv_{i,j}.$$

The coefficients are the same for both directions: (−1), 2, and (−1). The coefficients of the multipliers 630–632 are set to (−1), 2 and (−1). Because the output of the last multiplier 623 is not used, its coefficient can be set to zero. The shift register 610 stores values $X_{11}$ to $X_{14}$, $X_{21}$ to $X_{24}$, $X_{31}$ to $X_{34}$, and $X_{41}$ to $X_{44}$. To compute the horizontal Laplacian filter value for $X_{22}$, the multiplexers 620–623 route $X_{21}$, $X_{22}$, and $X_{23}$ to the multipliers 630–632. The coefficients of the multipliers 630–632 have already been set to (−1), 2 and (−1). The multiplication is performed and the result is stored in the accumulator 680. Next, the vertical Laplacian is calculated. Since the necessary values are already in the shift register 610, data does not have to be input. The multiplexers 620–623 route $X_{12}$, $X_{22}$, and $X_{32}$ to the multipliers 630–632. The coefficients need not be changed. The result of the multiply operation is added by adder 660 to the contents of the accumulator 680 and the result is stored in accumulator 680. The contents of the accumulator 680 are output to the holding latches 446 of the output addresser 440. Therefore, the Laplacian filter has been applied to a single pixel.

The Laplacian filter operation can be performed on three additional pixel values, i.e., $X_{23}$, $X_{32}$ and $X_{33}$, using the data already loaded in the shift register 610. Therefore, the speed of the calculation is increased because the number of accesses to load data from the image memory is reduced. While the calculation is proceeding, the input block addresser 630 and collector 620 can gather an adjacent set of image data for filter application.

The image transform processor can be implemented as an integrated circuit, or using discrete components.

Although the image transform processor has been described for use with an exemplary electronic digital still camera, the image transform processor can be used with a variety of electronic digital video cameras, scanners and printers. In addition, the present invention can be used with portable electronic devices having an image sensor such as a personal digital assistant (PDA).

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A programmable image transform processor for use in a digital image processing system, comprising:

a programmable addressing block comprising an input address generator having an input addressing microsequencer and an input addressing memory, the input addressing memory storing an input addressing procedure, to be executed by the input addressing microsequencer for generating input addresses from which to request image data; and a programmable arithmetic block for receiving the image data, the programmable arithmetic block having an arithmetic block memory storing an image processing procedure, the programmable arithmetic block having an arithmetic block microsequencer for executing the image processing procedure using the image data to generate processed image data.

2. The programmable image transform processor of claim 1 wherein the input addressing block includes a collector having a local input buffer, for storing data retrieved in response to the generated input addresses from the input address generator.

3. The programmable image transform processor of claim 1 wherein the local input buffer has a plurality of addressing modes.

4. The programmable image transform processor of claim 1 wherein the local input buffer is configured into blocks, piles and words, wherein a block has at least one pile and a pile has a plurality of words.

5. The programmable image transform processor of claim 1, wherein the input addressing microsequencer executes the input addressing procedure concurrently with the arithmetic block microsequencer executing the image processing procedure.

6. The programmable image transform processor of claim 1, further comprising:

an output address generator receiving processed image data from the arithmetic block, the output address generator having an output addressing microsequencer and an output addressing memory, the output addressing memory storing an output addressing procedure, to be executed by the output addressing microsequencer for generating addresses to which to store processed image data.

7. The programmable image transform processor of claim 6, wherein the output addressing microsequencer executes the output addressing procedure concurrently with the arithmetic block microsequencer executing the image processing procedure.

8. The programmable image transform processor of claim 6 wherein the programmable addressing block further comprises:

a collector having an input buffer for storing data received in response to the generated input address, and also having an output buffer for storing data processed by the arithmetic block.

9. The programmable image transform processor of claim 1 wherein the programmable arithmetic block further comprises:

a shift register for receiving requested image data from the programmable addressing block;

a coefficient memory for storing coefficients;

a multiplier/adder for multiplying the contents of the shift register by the coefficients stored in the coefficient memory; and an accumulator capable of adding consecutive values output by the multiplier/adder, wherein the accumulator outputs the processed image data.

10. The programmable image transform processor of claim 9 wherein the programmable arithmetic block further includes pipeline registers to control the shift register, the multiplier/adder and the accumulator, wherein the arithmetic block microsequencer loads instructions from the arithmetic block memory into one of the pipeline registers to process the image data.

11. The programmable image transform processor of claim 9 further comprising:
a histogram memory having bins, each bin having an address, such that the value stored in the accumulator is used as as bin address, and the value stored at the addressed bin is incremented by one.

12. The programmable image transform processor of claim 8 further comprising holding latches for temporarily storing data being transferred from the input buffer to the arithmetic block.

13. A programmable image transform processor for use in a digital image processing system, comprising:
a programmable arithmetic block coupled to a memory storing an image processing procedure, the programmable arithmetic block executing the image processing procedure using the image data, wherein the programmable arithmetic block receives digital image data from an image sensor, and the programmable arithmetic block executes the image processing procedure using the digital image data to generate processed digital image data; and
a programmable addressing block having an address generator coupled to a microsequencer for generating addresses at which to store the processed digital image data.

14. The programmable image transform processor of claim 13 wherein the programmable addressing block includes:
a buffer for storing the processed digital image data from the arithmetic block.

15. A method for processing image data, comprising the steps of:
storing an image processing procedure in a memory in an arithmetic block;
storing an output addressing procedure in a memory in an addressing block;
executing the image processing procedure in the arithmetic block;
receiving image data in the arithmetic block from an image sensor;
transforming the received image data;
outputting the image data to the addressing block to store the processed image data in a memory; and
executing the output address procedure in the addressing block, at times overlapping with execution of the image processing procedure by the arithmetic block, so as to generate output addresses at which to store the transformed image data in a memory array.

16. The method of claim 15, further comprising the steps of:
accessing a histogram memory using a value of the transformed image data as a histogram address to the histogram memory; and
incrementing a histogram value stored at the histogram address, whereby a histogram of the transformed image data is generated.

17. A method for processing image data, comprising the steps of:
storing an image processing procedure in a memory in an arithmetic block;
storing an input addressing procedure in a memory in an input addressing block;
storing an output addressing procedure in a memory in an output addressing block;
executing the input addressing procedure in the input addressing block to retrieve image data from an image memory;
executing the image processing procedure in the arithmetic block;
receiving in the arithmetic block the image data retrieved by the input addressing block;
transforming the received image data;
outputting the image data to the addressing block to store the processed image data in the image memory; and
executing the output address procedure in the addressing block, at times overlapping with execution of the image processing procedure by the arithmetic block, so as to generate output addresses at which to store the transformed image data in a memory array.

18. A digital imaging system comprising:
an image sensor for outputting analog image data;
an A/D converter coupled to the image sensor for converting the analog image data to digital image data;
an image memory coupled to the A/D converter for storing the digital image data;
a programmable image transform processor, coupled to the memory and microprocessor, comprising:
a programmable addressing block having an input address generator including an input addressing microsequencer and an input addressing memory, the input addressing memory storing an input addressing procedure, to be executed by the input addressing microsequencer for generating input addresses in the image memory from which to request image data; and
a programmable arithmetic block for receiving the image data, the programmable arithmetic block having an arithmetic block memory storing an image processing procedure, the programmable arithmetic block having an arithmetic block microsequencer for executing the image processing procedure using the image data to generate processed image data.

19. The digital imaging system of claim 18 wherein the input addressing block includes a collector having a local input buffer, for storing data retrieved in response to the generated input addresses from the input address generator.

20. The digital imaging system of claim 19 further comprising:
an output address generator receiving processed image data from the arithmetic block, the output address generator having an output addressing microsequencer and an output addressing memory, the output addressing memory storing an output addressing procedure, to be executed by the output addressing microsequencer for generating addresses in the image memory to which to store the processed image data.

21. A digital imaging system comprising:

an image sensor for outputting analog image data;

an A/D converter coupled to the image sensor for converting the analog image data to digital image data;

an image memory;

a programmable image transform processor, comprising:
- a programmable arithmetic block coupled to an arithmetic memory storing an image processing procedure, the programmable arithmetic block executing the image processing procedure using the digital image data to generate transformed image data; and
- a programmable addressing block having an address generator coupled to the arithmetic block for generating addresses at which to store the transformed image data in the image memory.

22. A programmable image transform processor comprising:

a configurable local input buffer for receiving image data from an image memory;

an addresser for generating a first set of image memory addresses and storing the image data in a first predetermined order in the local input buffer;

an input holding latch for receiving image data from the local input buffer;

an arithmetic block for receiving image data from the input holding latch and transforming the image data to generate transformed data;

an output holding latch for receiving the transformed data from the arithmetic block;

a configurable local output buffer for receiving the transformed data from the output holding latch, wherein the addresser stores the transformed data in a second predetermined order in the local output buffer and generates a second set of image memory addresses for storing the transformed ordered data.

* * * * *